United States Patent [19]

Harper et al.

[11] 4,323,336
[45] Apr. 6, 1982

[54] INSERTING STICKS INTO CONFECTIONS

[75] Inventors: Bruce M. Harper, San Jose; Ronald J. Billett, Sunnyvale; Thomas E. Roberts, Saratoga; Veikko K. Viitanen, San Jose, all of Calif.

[73] Assignee: FMC Corporation, Chicago, Ill.

[21] Appl. No.: 146,935

[22] Filed: May 5, 1980

[51] Int. Cl.³ .......................... B29D 3/00; B29C 1/00
[52] U.S. Cl. ................................. 425/126 S; 53/594
[58] Field of Search ................. 53/546, 581, 128, 134, 53/594; 221/96, 81; 426/134, 414, 512, 515; 198/486, 489, 750; 264/40.1; 425/117, 126 S, 135, 139, 161, 162, 163

[56] References Cited

U.S. PATENT DOCUMENTS

| | | | |
|---|---|---|---|
| 2,513,609 | 7/1950 | Werner | 425/126 S |
| 2,953,105 | 9/1960 | Rasmussen | 425/126 S |
| 2,953,997 | 9/1960 | Glass | 425/126 S |
| 3,031,978 | 5/1962 | Rasmussen | 425/125 |
| 3,038,635 | 6/1962 | Rasmussen | 221/81 |
| 3,478,703 | 11/1969 | Peppler et al. | 425/126 S |
| 3,691,608 | 9/1972 | Lowrance | 425/135 |
| 3,730,661 | 5/1973 | Tremblay | 425/126 S |
| 4,105,384 | 8/1978 | Morch | 425/126 S |

FOREIGN PATENT DOCUMENTS

| | | | |
|---|---|---|---|
| 636701 | 2/1962 | Canada | 425/126 S |
| 943815 | 3/1974 | Canada | 425/126 S |
| 2628621 | 6/1976 | Fed. Rep. of Germany | 425/126 S |
| 265126 | 7/1970 | U.S.S.R. | 426/515 |

OTHER PUBLICATIONS

Anon.–"Product Information", Hoyer, Aarhus, Den.

Primary Examiner—Willard E. Hoag
Attorney, Agent, or Firm—R. B. Megley; L. J. Pizzanelli

[57] ABSTRACT

A stick inserter for inserting flat sticks into partially frozen confections in the molds of a confection machine forms a packed column of sticks in face to face engagement above a row of molds, a row of spaced thin blades is lowered and each blade forces a stick out of the column and into a confection. Upon retraction of the blades, pivotally mounted lower guide rails for the column, which have been lowered to accommodate stick insertion, are raised to restore displaced sticks back to their original positions in the column. In order to insure stick singulation, a jogging mechanism partially lowers the blades ad then retracts them slightly and a blade deflection plate releases previously deflected blades so that they spring against the faces of sticks adjacent to those to be inserted. A packer is provided between a stick feeder and the stick insertion zone of the inserter for exerting a selected constant pressure on the sticks during ejection in a manner that isolates the portion column sticks in the stick insertion zone from pressure exerted on the column by the feeder.

27 Claims, 32 Drawing Figures

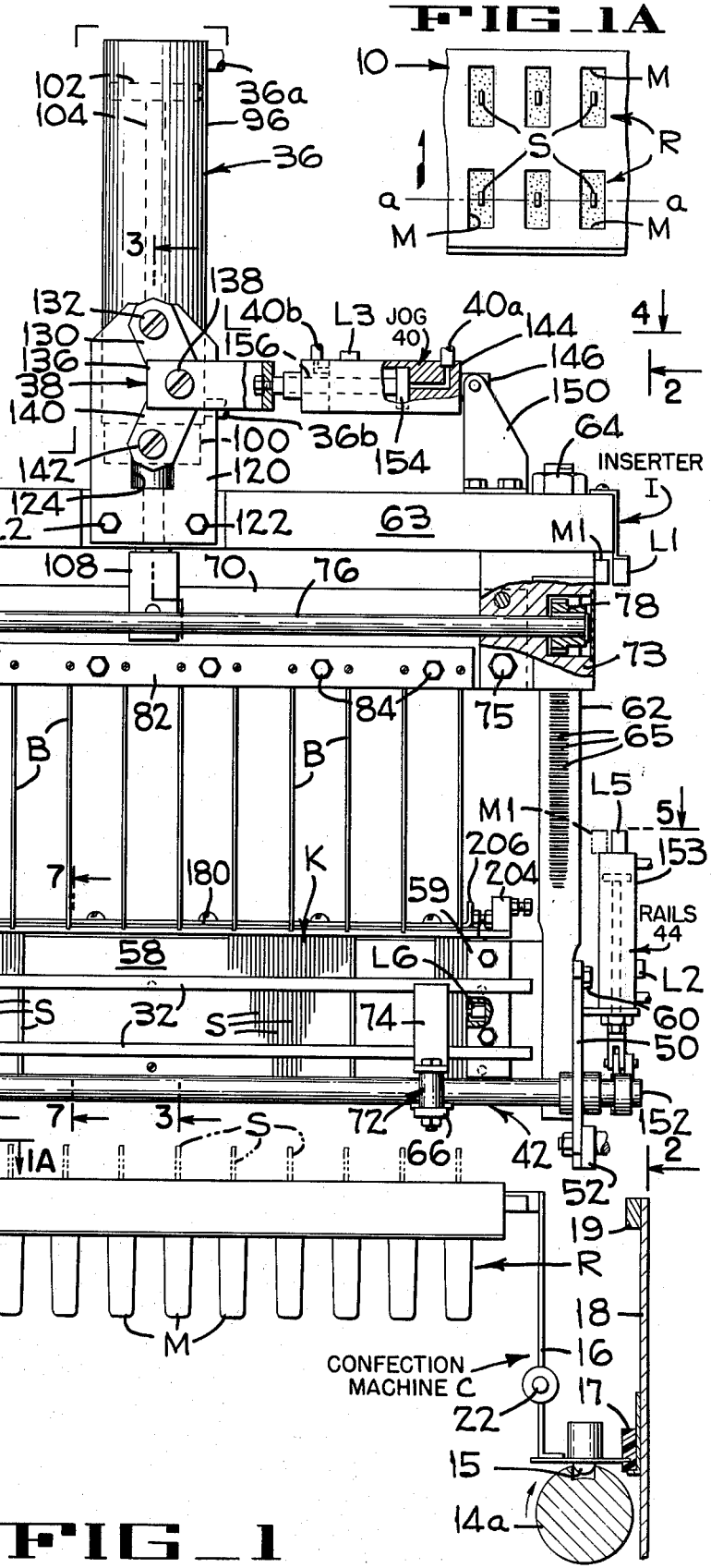

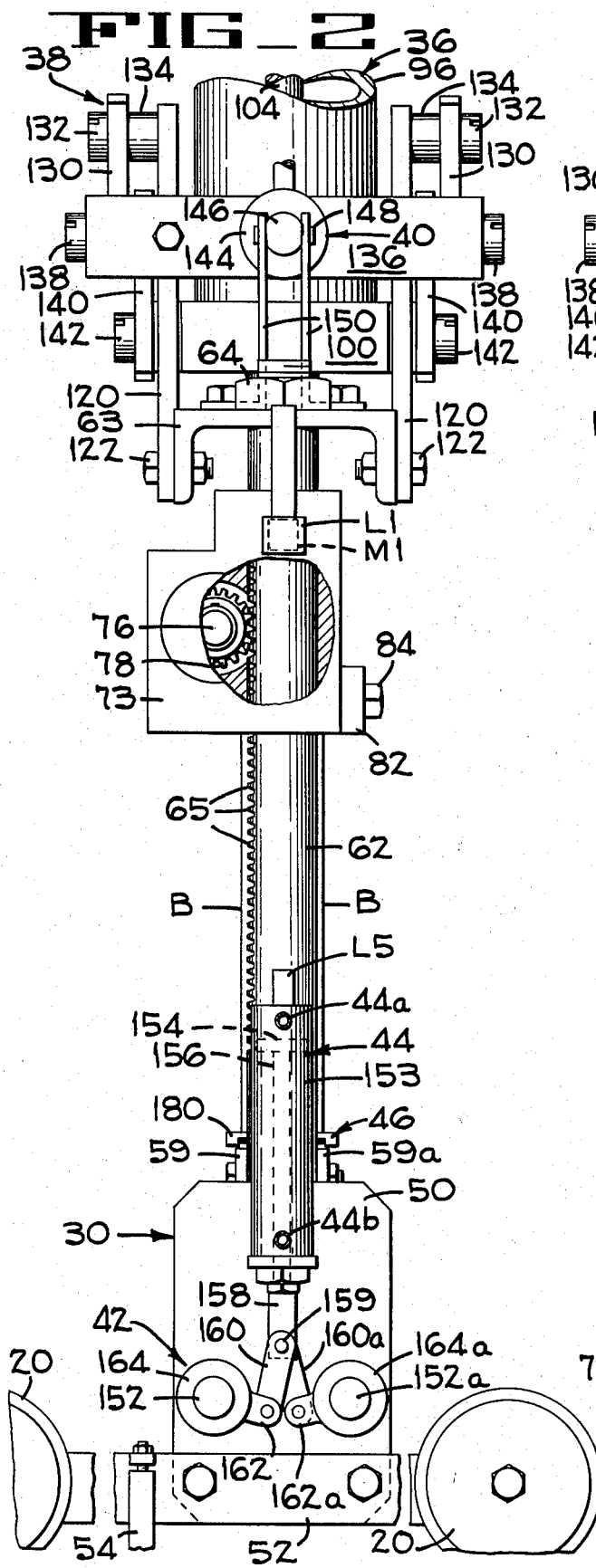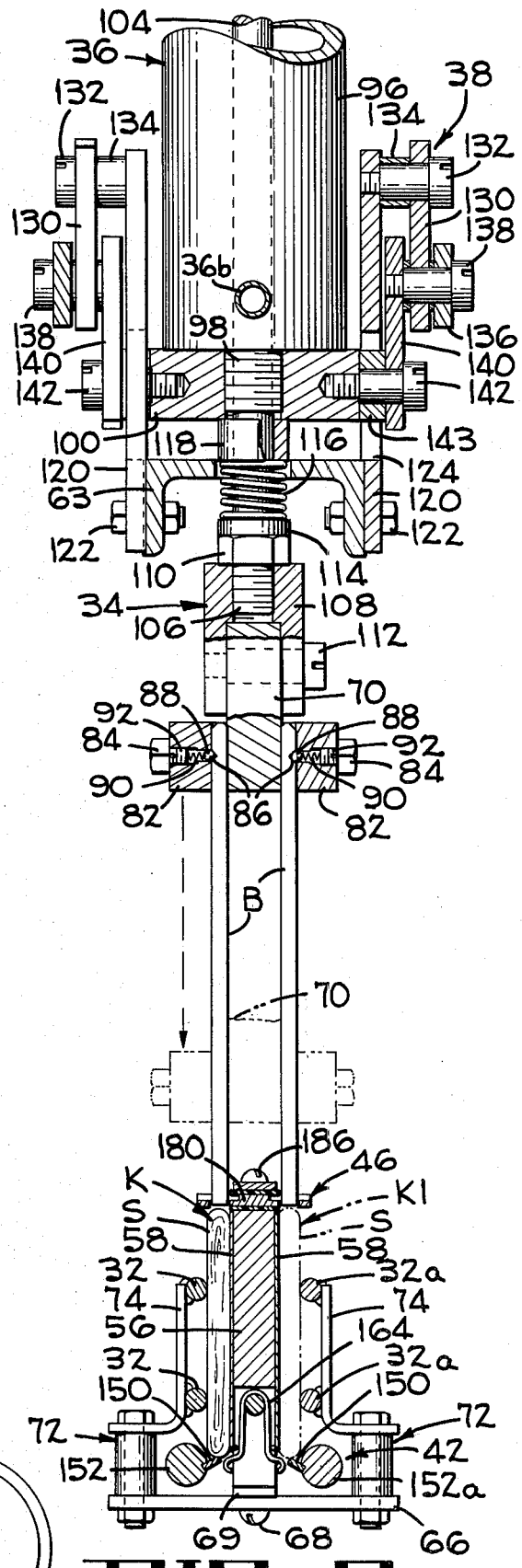

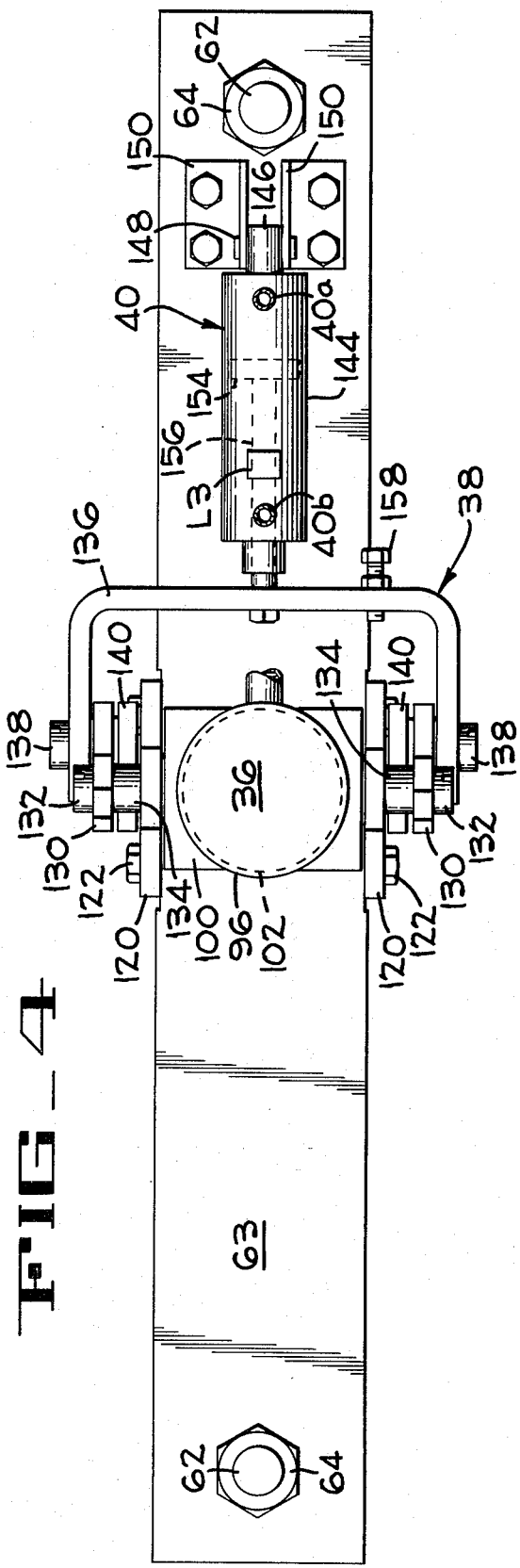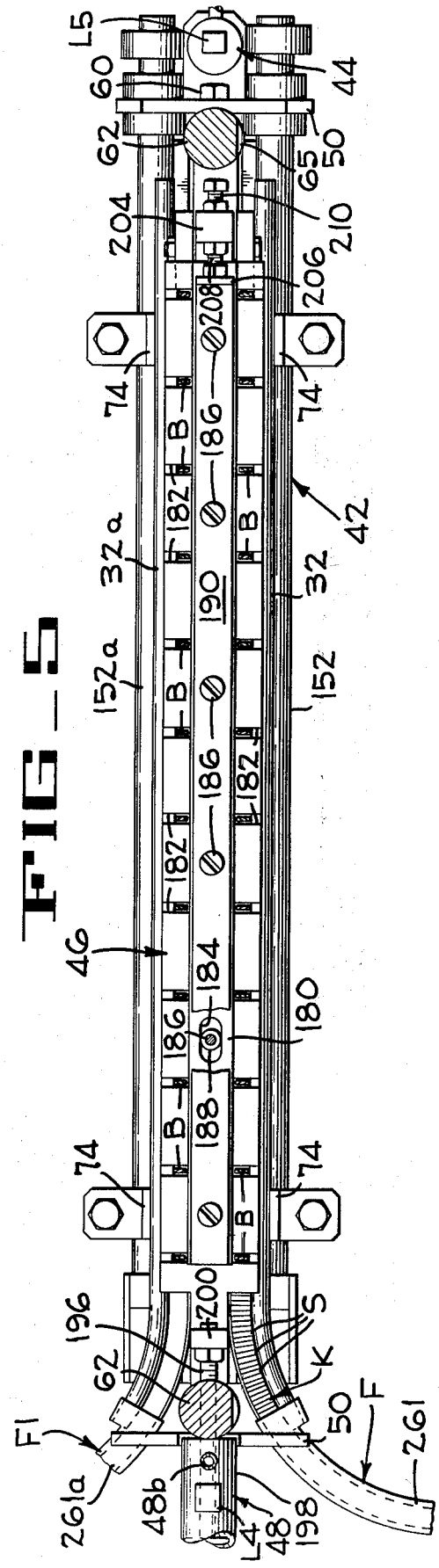

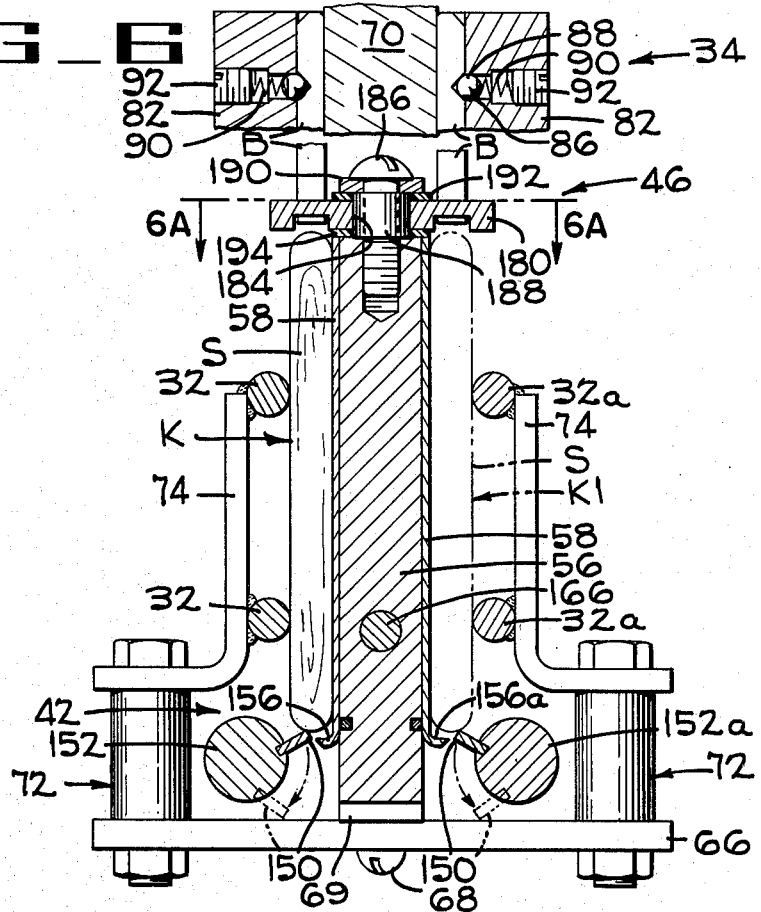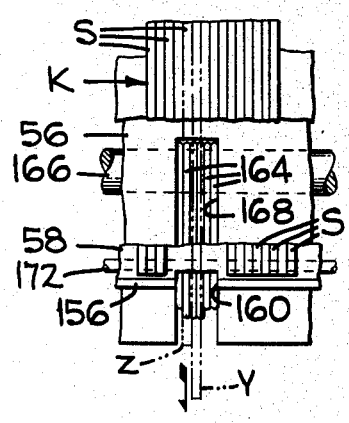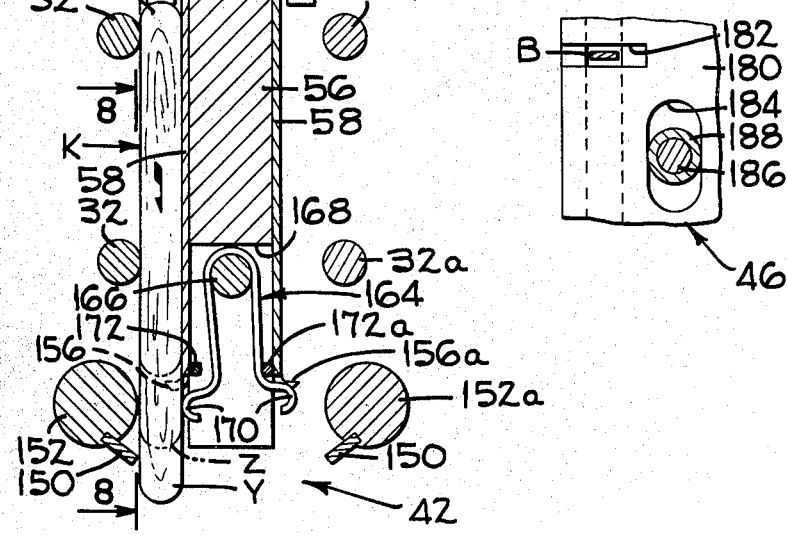

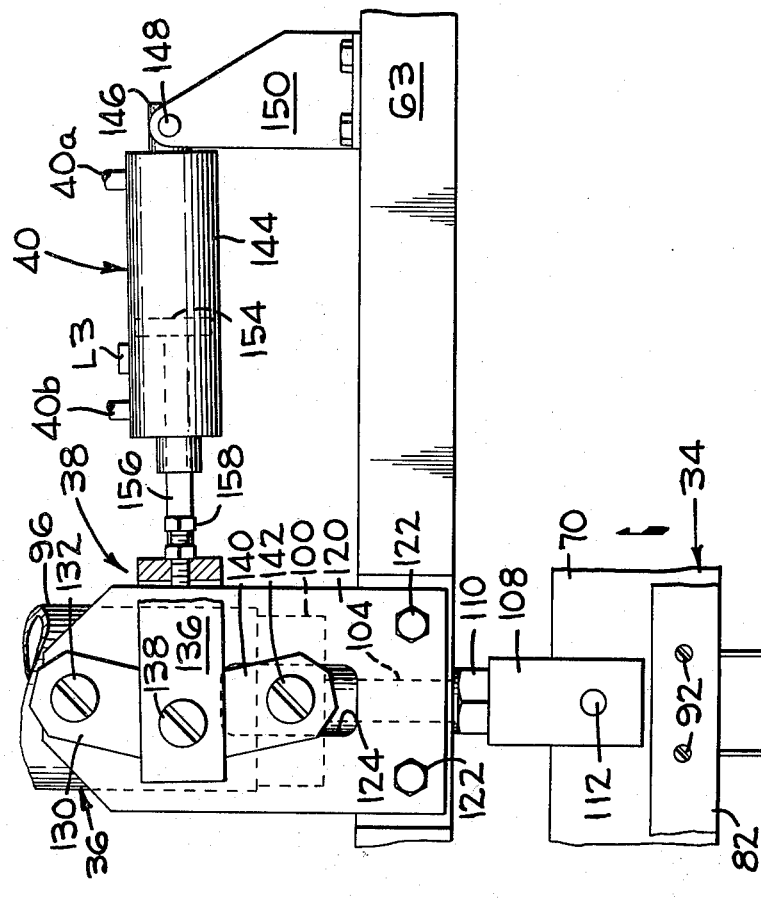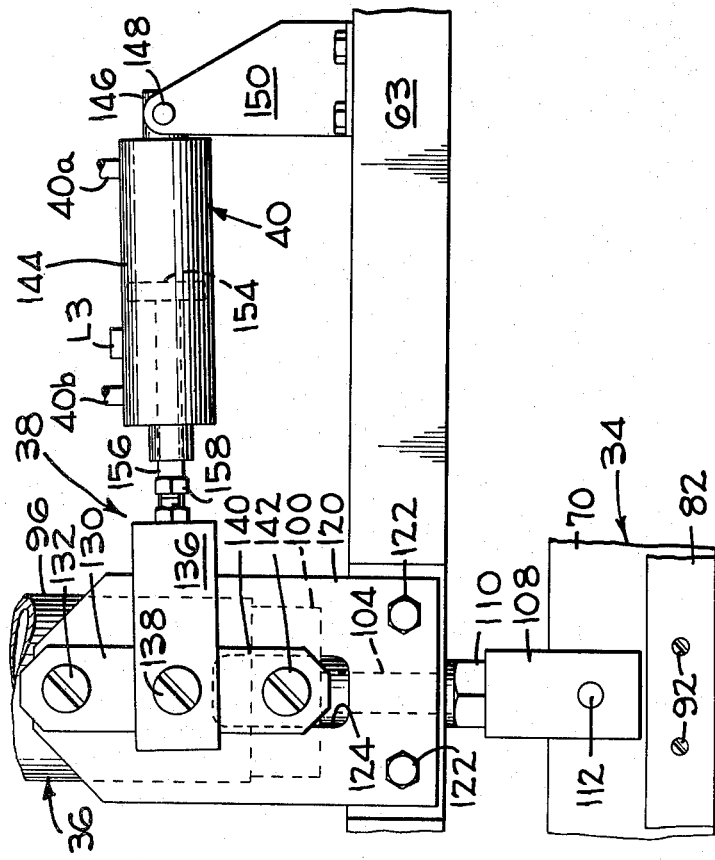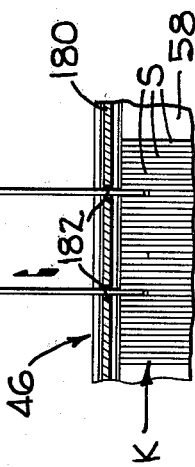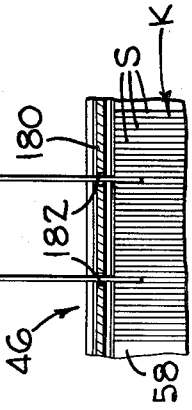

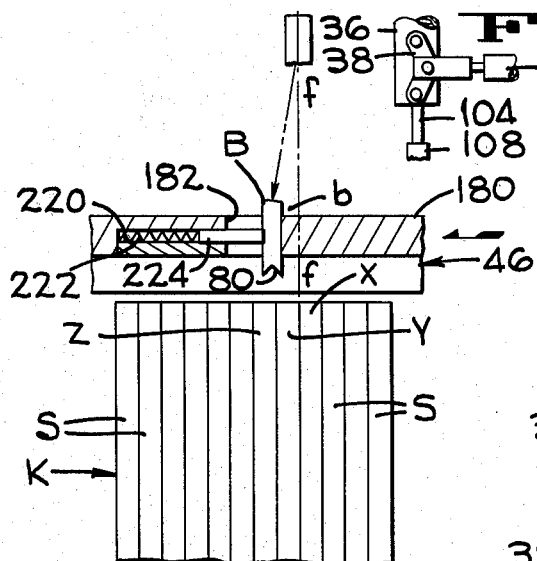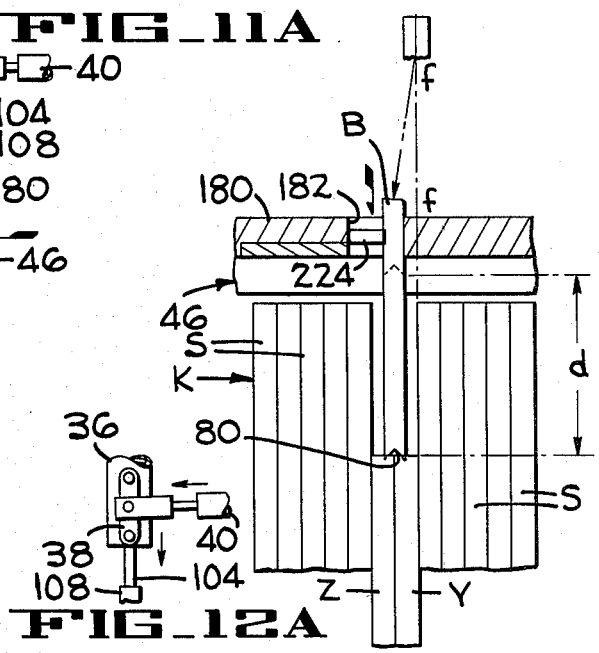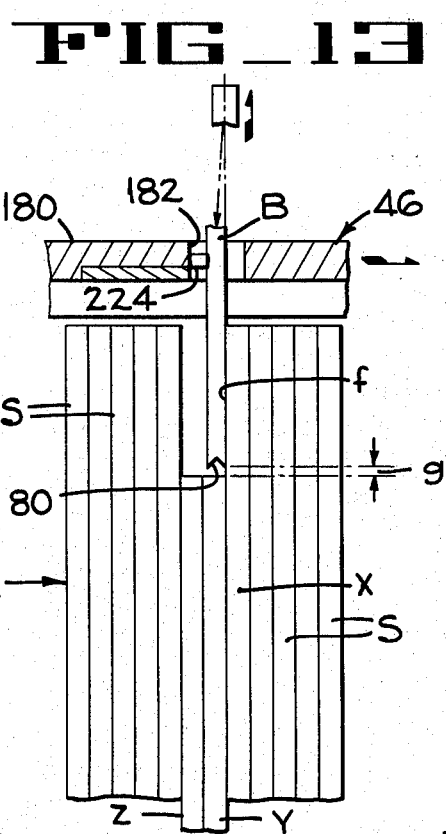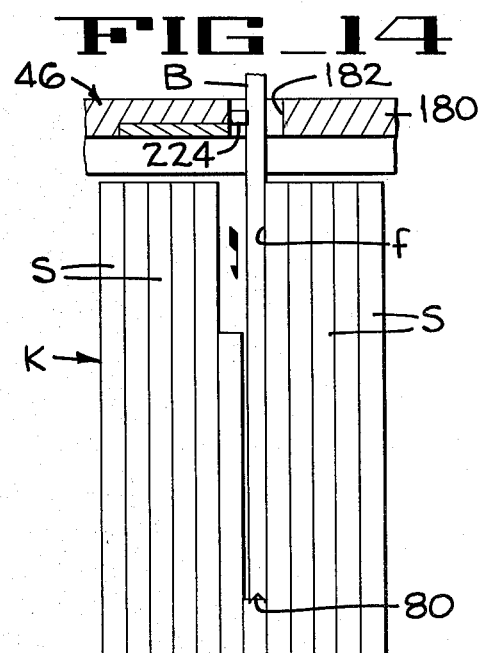

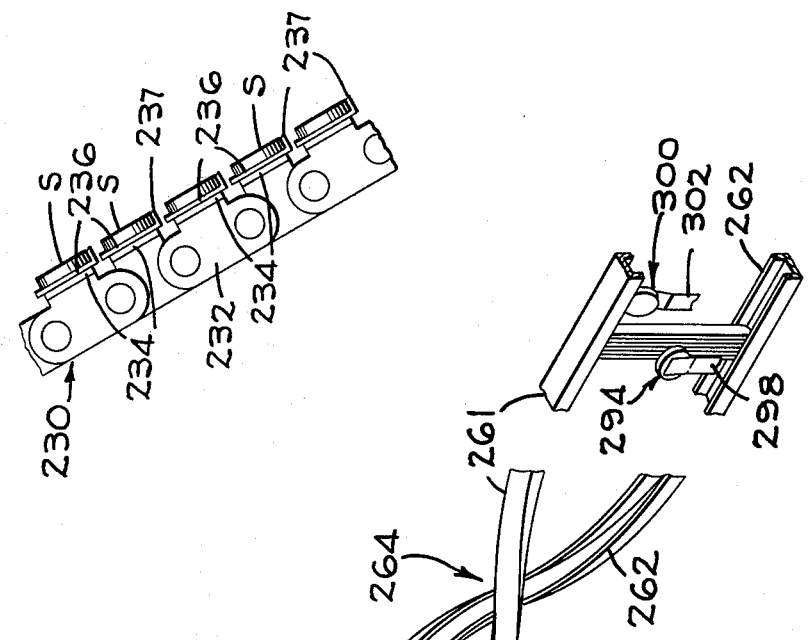
FIG_16A
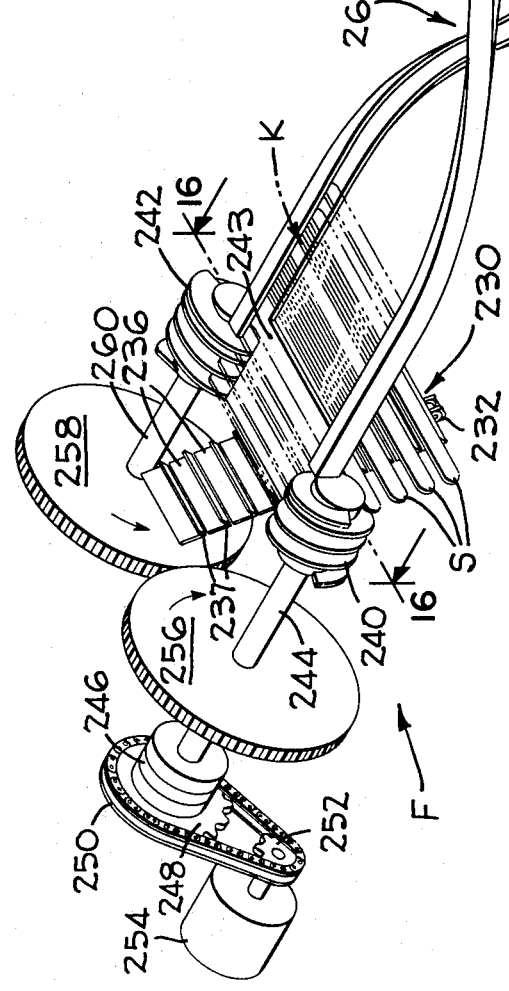
FIG_15
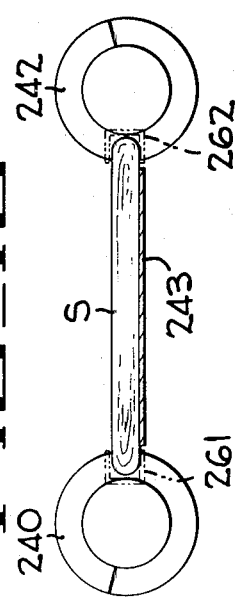
FIG_16

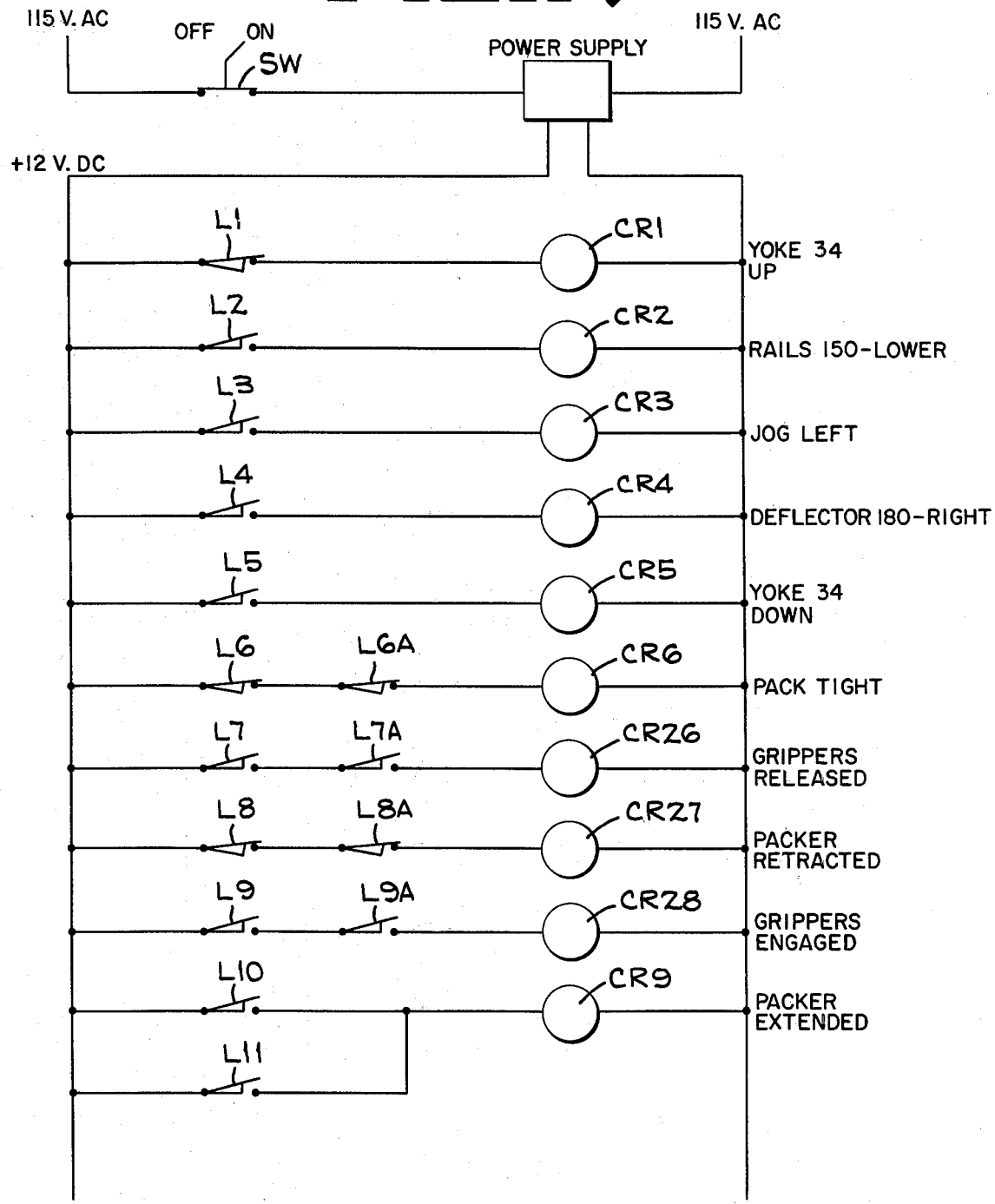

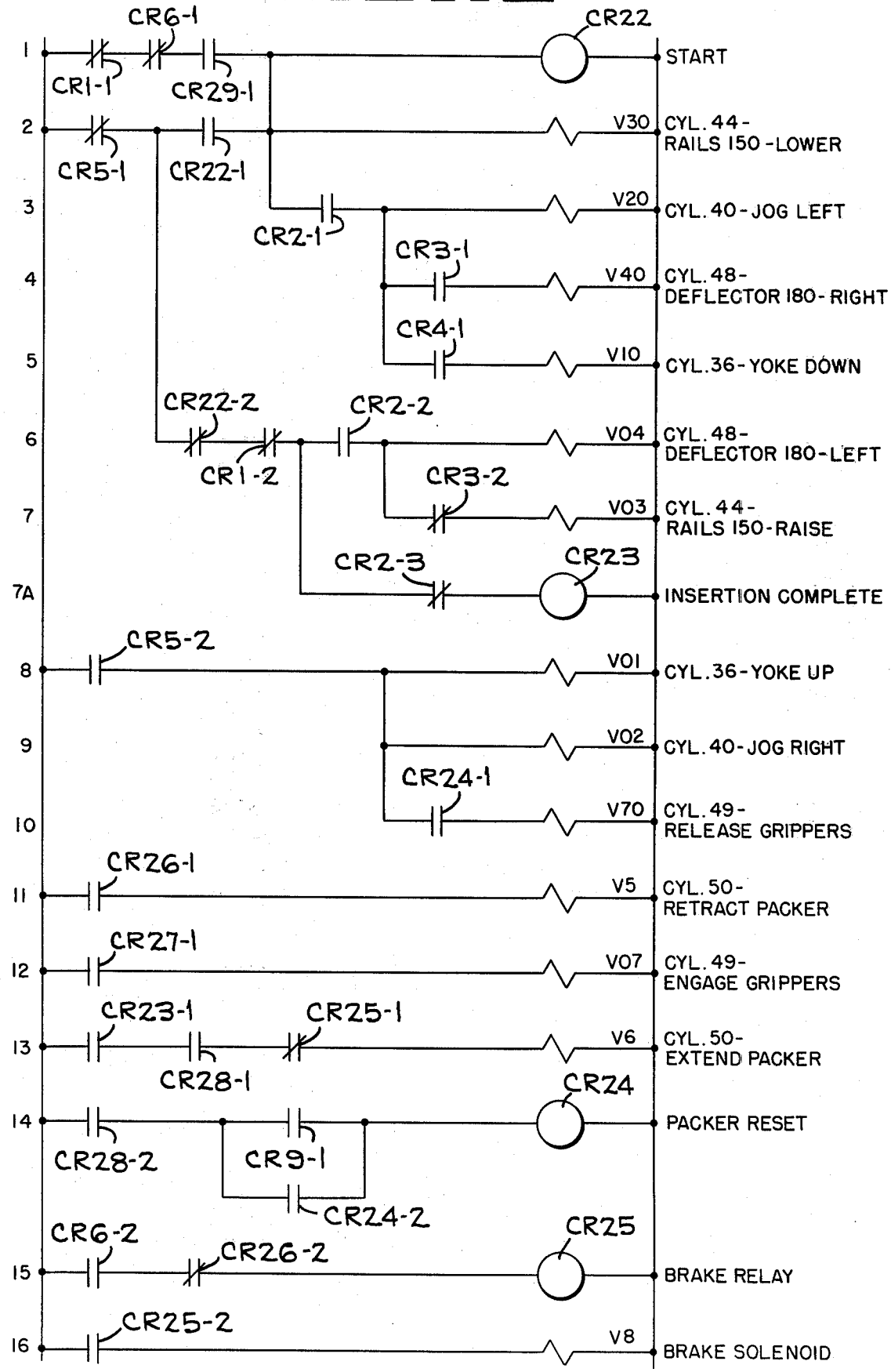

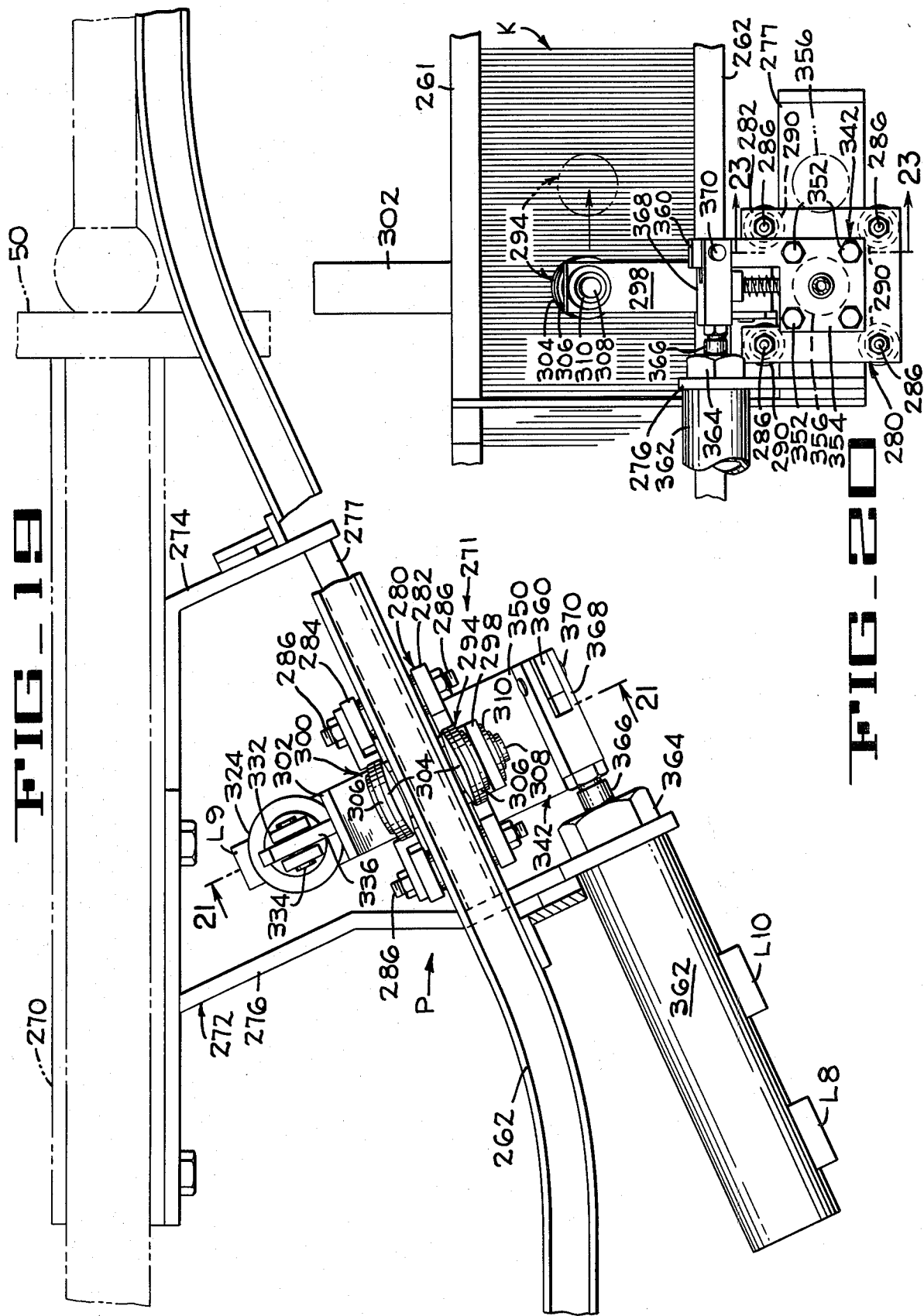

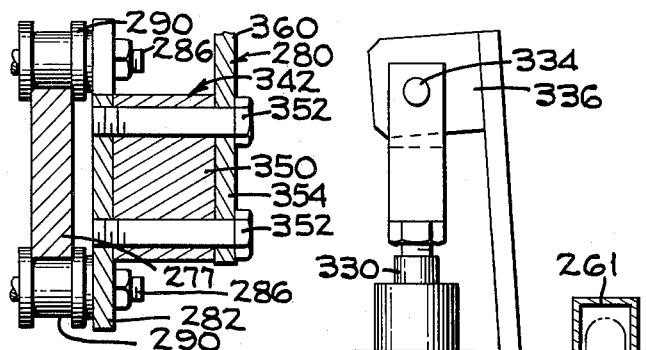
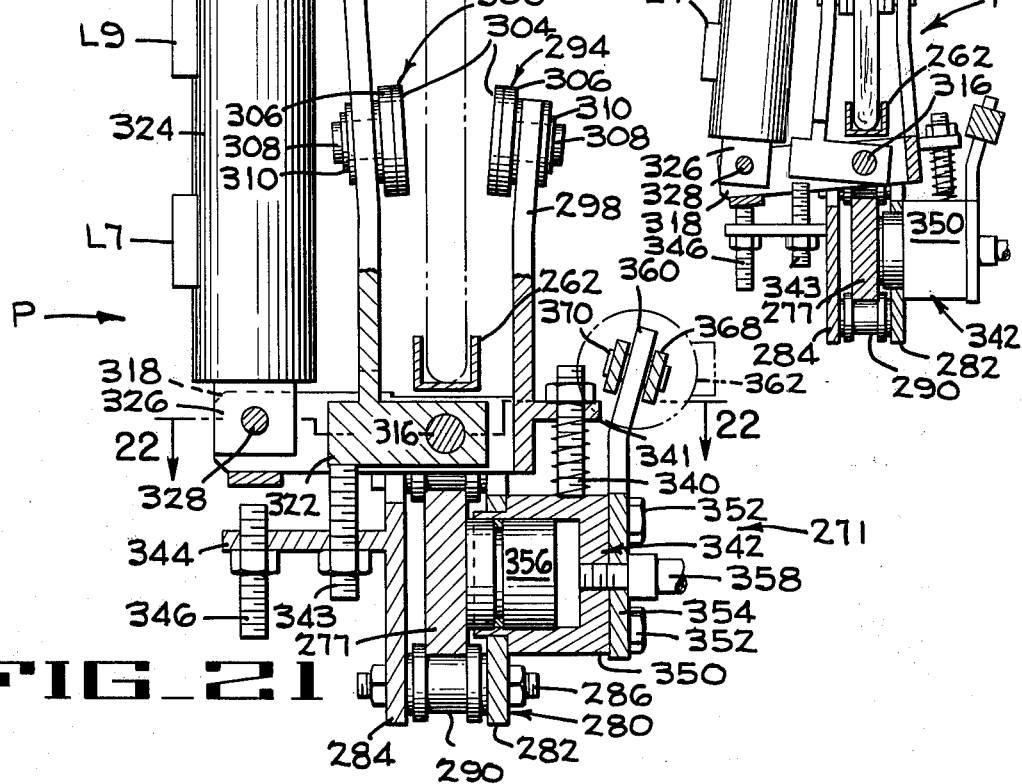
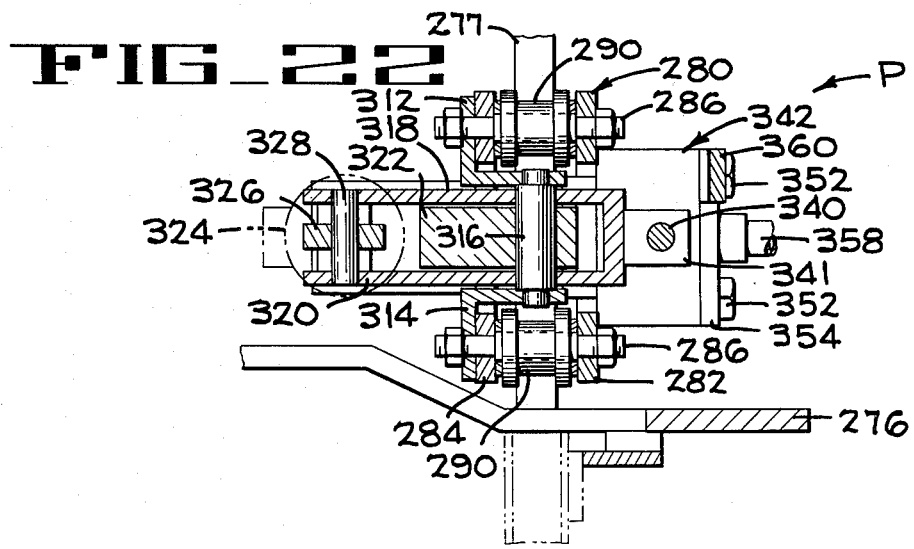

INSERTING STICKS INTO CONFECTIONS

FIELD OF THE INVENTION

This invention relates to frozen confection machines and more particularly to the insertion of sticks into partially frozen confections therein.

DESCRIPTION OF PRIOR ART

The U.S. Pat. No. to Rasmusson 3,031,978, May 1, 1962, discloses a frozen confection machine of a type sold by the FMC Corporation, assignee of the present invention.

Briefly, the Rasmusson machine includes a freezing brine tank in which runs the upper reach of an indexed mold conveyor carrying a bed of transverse mold plates each having a row of generally rectangular section mold cavities with their long dimensions parallel to the row axis. The machine also includes a filler for the mold cavities and a stick inserter, which can be positioned at the optimum point along the brine tank, for inserting sticks into the confections when they are in a partially frozen condition. The machine further includes a defroster for freeing the frozen confections from their molds and an extractor for gripping the sticks and withdrawing the released confections from their mold cavities for subsequent packaging. Other machines on the market perform the same operations, but the mold plates are mounted on a rotary carrier instead of on a conveyor chain.

The U.S. Pat. No. to Peppler et al 3,487,703, Nov. 18, 1969, discloses a stick inserter for a confection machine wherein the sticks are inserted in a row of rectangular section mold cavities arranged longitudinally of the axis of the row, as in the aforesaid Rasmusson machine. Also, the flat faces of the inserted sticks are parallel to the row axis, as in Rasmusson. In the Peppler et al patent, a surge system 16 feeds a column of packed sticks around a flanged wheel 96 and up channels 56 to the inserting mechanism. A feeding force is developed on the flanged wheel 96 by a weight 82 and a belt arrangement 88. A column of sticks is formed and a row of sticks is picked up from the end 116 of the column by downwardly facing grooves formed in a belt section 124 as it advances across the column. The belt delivers the sticks to vertically reciprocating stick inserters with the sticks disposed horizontally and in edge to edge spaced relation. The row of sticks is swung 90° from the belt 124 into clamping engagement with a row of vertically reciprocating abutment elements 188. The latter now descend and insert the edgewise row of sticks into their respective mold cavities.

The U.S. Pat. No. to Morch 4,105,384, Aug. 8, 1978, employs screws (not shown) to form a U-shaped column of sticks gravity packed by a weight. At the end of the column the sticks are picked up horizontally and in spaced, edge to edge relation and by notches in a reciprocating conveyor slide 6. The slide advances into alignment with stick inserter grippers 17 whereupon the sticks are picked up from the slide by transfer pivot arms 16 and turned 90° to a vertical position, to be received by the stick insertion grippers 17. As in the Peppler et al patent, the sticks are inserted into the mold cavities in spaced edge to edge relationship.

The use of slat belts for receiving sticks from a hopper and feeding them between a pair of feed screws that receive the ends of the sticks, for forming a packed column like that shown in the aforesaid Morch patent is mentioned in a "Hoyer—Product Information" leaflet of four pages printed by O. G. Hoyer A/S, 13 Soren Nymarksvej, Aarhus-Hojbjerg, Denmark. The Hoyer machine is sold in the trade.

The U.S. Pat. Nos. to Rasmusson 2,953,105, Sept. 20, 1960 and 3,038,635, June 12, 1962, disclose stick inserters wherein the rectangular section mold cavities are oriented with their long dimensions parallel to the axis of a row of cavities and wherein the flat sticks have their faces parallel to the axis of the row. Rasmusson 2,953,105 discloses the use of a cleated belt for picking up sticks from a hopper.

SUMMARY OF THE INVENTION

The stick inserter of the present invention inserts a row of flat sticks into confections in a row of mold cavities wherein the longer dimensions of the cavities are disposed transversely of instead of parallel to the row axis. By disposing a row of generally rectangular section molds transversely of the row axis, instead of parallel thereto as in prior machines, the number of mold cavities per row (row density) can be increased without lengthening the row. As a corollary, a given number of molds can be placed in a shorter row, thereby reducing the width of the machine.

In order to insert the sticks in a high density row of mold cavities, such as that just described, wherein the centers of the cavities are relatively close together, a stick inserter must be compact in the longitudinal direction of a row of molds, and this is a characteristic of the inserter of the present invention.

Another feature of the present invention is the provision of a stick inserter wherein the introduction of sticks from a stick feeding apparatus to the actual inserting apparatus above a row of mold cavities requires no transfer operation from a stack of sticks to reciprocating belts or slides and the positioning of sticks to their positions above the mold cavities requires no stick transfer elements at the inserters, such as those of the aforesaid Peppler et al and Morch patents.

In the present invention, the sticks are fed to the inserters as a closed column which is merely a terminal portion of a previously formed stack of sticks. Thus the sticks are supplied directly from stick guiding channels of a feeder to the actual reciprocating stick inserting units without requiring the use of intermediate mechanism such as notched belts, pick off rollers, reciprocating slides or stick turners, all of which involve stick transfer operations. Since every stick transfer operation presents a possible zone of jamming, stick misalignment and breakage, the simple column feed stick inserter of the present invention is substantially jam-free.

Since there are no mechanical stick orienting operations at the inserters, the stick inserter of the present invention lends itself to the insertion of sticks in a relatively large number of mold cavities in a row of a given length (high density mold cavity array) with the insertion motion being one of simple linear reciprocation of the actual inserters. The stick inserter of the present invention is compatible with a variety of stick magazines and stick feeder units and can be employed on prior confection machines, provided longer dimensions of their mold cavities are arranged transversely of the row axis, as previously described.

Briefly, the stick inserter of the present invention unidirectionally feeds and positions a column of closed sticks directly from a supply stack so that ends of the sticks in the column are adjacent to a row of confections. The inserter pushes spaced individual sticks endwise directly out of the packed column and inserts them without change in orientation into adjacent confections, leaving gaps that form intermediate groups of sticks in the column. These gaps are quickly closed.

In the preferred arrangement, the sticks are displaced from the packed column and inserted into the confections by a row of thin, flat blades which are simultaneously advanced or lowered to push spaced individual sticks endwise from the packed column and into adjacent confections. After the blades have been withdrawn from the column, the gaps in the column formed by the removal of inserted sticks are closed by force exerted on the stick-receiving end of the packed column.

In case some sticks in the packed column which are disposed adjacent to the inserted sticks happen to be partially displaced during insertion (because of frictional engagement with inserted sticks) such partially displaced sticks may be restored to their original positions in the column of sticks after each insertion operation, so that they do not inhibit subsequent re-packing and advance of the column. In the preferred embodiment, this stick restoring action is provided by supporting the free ends of a column of sticks on a moveable guide rail which rail is swung clear of the supported ends of the sticks to accommodate stick insertion and which is brought back to its original position after the insertion operation, to thereby restore partially displaced sticks to their original positions in the column.

In accordance with the present invention, means are provided to insure that each stick inserting blade pushes only a single stick entirely clear of the packed column of sticks and into the adjacent confection. This is preferably accomplished by a "jogging" apparatus which partially lowers the blades into the column of sticks and then slightly retracts the blades so their free ends are clear of the previous engaged ends of the sticks. Each blade is now permitted to spring laterally against the flat face of a stick adjacent to a single stick to be inserted, whereupon the final advance of the blades is completed with the assurance that only one stick is pushed out of the packed column and into an associated confection by each blade.

The aforesaid stick singulation is assured by operation of a blade deflecting plate which initially deflects the blades before they are partially lowered by the jogging operation and then frees the blades after they have been raised slightly so that each blade can spring against the face of a stick adjacent to that to be inserted.

Since wooden confection sticks are not perfectly flat, when a column of wooden sticks is assembled, the slight deviations of individual sticks from flatness are cumulative and the column has properties analogous to an assemblage of belleville spring washers, that is, the column acts like a long compression spring. If the column at the stick insertion zone is not closely packed along its entire length, some sticks will be somewhat loose in the column and the desired precise orientation of such sticks is lost, particularly when the portion of the entire column of sticks at the insertion zone is remote from the stick feeder.

Also, as mentioned hereinbefore, re-packing of the column of sticks at the insertion zone is required when the blades of the stick inserting apparatus are withdrawn from the column. The gaps in the column of sticks left after blade withdrawal must be closed to maintain or secure proper stick orientation and to prevent turning or flipping of one or more individual stick about their longitudinal axes before the next stick insertion cycle.

To insure that the sticks at the insertion zone are all oriented substantially normal to the axis of the column, that none of the sticks flip upon removal of the pusher blades, that minimum blade interference is created during stick insertion and that the column is properly re-packed after each insertion step, the present invention preferably provides an apparatus for packing the portion of the column of sticks at the stick insertion zone with a controlled pressure. The packing apparatus is adapted to provide an adequate packing and orienting force on a long column of sticks between the feeder and stick insertion zone in a manner that could not be provided by the feeder itself without stick breakage at the feeder. The packing apparatus of the present invention pushes against a portion of the column which is adjacent the upstream end of the stick insertion zone and which is remote from a column stop member downstream of the stick insertion zone. The packing force is selected so that enough force is applied to firmly pack and properly orient the sticks in the packed column portion within the insertion zone and to prevent "flipping" of the sticks in that zone.

In a preferred embodiment, the packing apparatus includes a pushing device which is first moved laterally of the column to engage opposite sides of several sticks. The pushing device is then shifted longitudinally of the column toward a stop member at the downstream end of the insertion zone to compress or pack that portion of the column that extends along the stick insertion zone. Preferably, the pusher device includes opposed stick gripping or clamping shoes which are rotatably mounted on clamping arms to accommodate any slight angular misorientation of the sticks that occurs during the packing operation as a result of cumulative curvatures or warpedness of the sticks at the stick insertion zone.

BRIEF DESCRIPTION OF THE DRAWINGS

FIG. 1 is a side elevation of the stick inserter of the present invention associated with a frozen confection machine.

FIG. 1A is a partial plan taken on line 1A—1A of FIG. 1 showing mold plates with single mold cavities.

FIG. 1B is a view like FIG. 1A showing mold plates with dual cavities.

FIG. 2 is an enlarged fragmentary side view taken on line 2—2 of FIG. 1.

FIG. 3 is an enlarged transverse section taken on line 3—3 of FIG. 1.

FIG. 4 is an enlarged plan taken on line 4—4 of FIG. 1.

FIG. 5 is an enlarged section taken on line 5—5 of FIG. 1.

FIG. 6 is an enlarged section taken on line 6—6 of FIG. 1 with portions being broken away.

FIG. 6A is a fragmentary section taken on line 6A—6A of FIG. 6.

FIG. 7 is an enlarged section like that of FIG. 6, but taken on line 7—7 of FIG. 1 to show the stick restraining springs.

FIG. 8 is a fragmentary view looking along line 8—8 of FIG. 7 and showing the springs.

FIGS. 9 and 10 are enlarged, fragmentary side elevational views that illustrate intermediate steps of the stick insertion operation.

FIGS. 11-14 are fragmentary operational views which further illustrate the steps of the stick insertion operation.

FIGS. 11A-14A are reduced fragmentary diagramatic views showing toggle operations corresponding to FIGS. 11-14.

FIG. 15 is a fragmentary perspective of a feeder that forms a packed column of sticks for the stick inserting blades.

FIG. 16 is a view looking along line 16—16 of FIG. 15.

FIG. 16A is a fragmentary side view of the feeder chain.

FIG. 17 is a control wiring diagram showing the switches actuated by positioning of various units and their associated relay coils.

FIG. 18 is a control wiring diagram showing relay contracts and solenoid air valve actuators for the relay coils of FIG. 17.

FIG. 19 is a plan view of the packing apparatus.

FIG. 20 is a side elevation of the packing apparatus drawn on a reduced scale.

FIG. 21 is a view taken on line 21—21 of FIG. 19 showing the pusher device grippers open.

FIG. 21A is a view like FIG. 21 drawn to a smaller scale showing the grippers closed.

FIG. 22 is a section taken on line 22—22 of FIG. 21.

FIG. 23 is a section taken on line 23—23 of FIG. 20.

GENERAL ARRANGEMENT

Referring to FIG. 1, a stick inserter I is shown mounted on a frozen confection machine C. Except for the orientation of the mold cavities, the details of the confection machine are not critical to the present invention. In FIG. 1, the confection machine C is formed in accordance with the co-pending application of R. C. Billett et al, entitled, Apparatus For Producing Frozen Confections, and assigned to the FMC Corporation, the disclosure of which is incorporated herein by reference. The stick inserter I could be employed in connection with a conventional linear conveyor "Vitaline" machine such as that in the aforesaid Rasmusson U.S. Pat. No. 3,031,978, (with the molds rearranged) and marked by FMC Corporation, or with a rotary conveyor machine, which is also on the market.

The confection machine C, illustrated at the bottom of FIG. 1 includes a plurality of elongate mold plates 10 each of which has two rows R of depending molds M forming mold cavities for the confections. Mold plates 10 are intermittently advanced from a filler along a brine tank (not shown) for freezing the confections and are momentarily arrested under the stick inserter before the confections have solidified. After stick insertion, the molds are advanced along other stations, as described in detail in the aforesaid Billett et al application. Rotating lead screws 14,14a engage drive buttons 15 mounted on side bracket assemblies 16 which support the mold plates 10. The side brackets 16 are guided in slots formed in side rails 17 mounted on vertical side frame plates 18. Tracks 19 are mounted along the upper portions of the side plates 18 for supporting wheels 20 (one wheel only being shown at the left of FIG. 1) that facilitate selective positioning of the stick inserter I along a freezing reach of the confection machine.

As described in detail in the aforesaid pending application of Billett et al, means are provided for laterally shifting the conveyor brackets 16 from one longitudinal reach of the confection machine to a return reach. This shifting action includes transverse screws (not shown) one of which engages a drive detent member 21 for shifting the brackets 16 and associated mold plates to the right in the drawings and another screw for engaging the drive detent 22 for shifting the mold plates back to the position illustrated in FIG. 1.

FIG. 1A is a fragmentary plan view showing one type of mold arrangement which can be employed. In this form, each mold plate 10 has two rows R of rectangular section molds M, with the major dimensions of the molds and the cavities formed thereby being disposed perpendicular to the axis a—a of the row. This mold disposition maximizes the number of molds that can be provided in a given length row, or shortens the row for a given number of molds. When the stick inserter of the present invention operates to insert sticks S into the mold cavities arranged as in FIG. 1A, a row of sticks is inserted into the molds of each row with the flat faces of the sticks normal to the row axis "a—a".

FIG. 1B shows an arrangement wherein the confections are of smaller size as in the case of popsicles. Here the molds Ma, although generally rectangular in section and disposed normal to the axis "a—a" of a row R1 of molds, are formed to provide two cavities which are preferably joined by a necked down section to facilitate filling of the two cavities simultaneously. When inserting sticks into molds such as those shown in FIG. 1B, the stick inserter I of the present invention is operated as a dual lane machine, inserting two sticks into each mold cavity during one indexing operation of the mold plate conveyor.

In the interest of brevity, the stick inserter of the present invention will be primarily described as functioning to insert only a single row of sticks into the confections, as would be the case in cases of the mold array shown in FIG. 1A.

Major Inserter Components

The major components of the stick inserter I are as follows:

A stick inserter frame assembly indicated generally at 30 which mounts the support wheels 20, two sets of guide rails 32,32a for receiving packed columns K of sticks S in position above the rows of molds and other elements to be described.

A crosshead or yoke 34 which mounts two rows of thin, flat flexible blades B for pushing individual sticks out of a packed column K of sticks S below and into the confections in the cavities of underlying molds.

The yoke 34 is operated by a main double acting air cylinder unit 36 and by a jogging toggle linkage mechanism 38 operated by a jogging air cylinder unit 40. In order to guide the lower ends of sticks in the column K and to restore partially displaced sticks to their original positions, a moveable guide rail and stick control mechanism 42 is provided which is operated by a double acting air cylinder unit 44.

Disposed at the lower ends of the blades B when the latter are in their raised or retracted position is a reciprocating blade deflecting plate assembly 46 operated by a double acting deflection air cylinder unit 48.

Frame Assembly

The frame assembly, indicated generally at 30, includes side brackets 50 (FIGS. 1 and 2), each of which is supported by a longitudinal bar 52 that mounts pairs of the wheels 20, previously mentioned. The stick inserter, after having been rolled along the rails 19 of the confection machine in a selected position is clamped at that position by a clamp 54 (FIG. 2) in accordance with conventional practice.

As seen in FIGS. 1, 3 and 5, a transverse stick column guide beam 56 extends across a row of molds and the outer faces of the beam have secured thereto thin slide plates 58. A back stop 59 (FIGS. 1 and 2) is fitted to beam 56 to stop advance of the stick column K and a companion stop 59a for a column K1 is disposed on the other side of beam 56. The ends of the beam 56 are supported on end frame brackets 50 by throughbolts 60 (FIG. 1) which extend through vertical rack rods or posts 62 and into the ends of the beam 56.

The upper ends of rods 62 are bolted to a cross channel 63 by nuts 64 (FIGS. 1 and 4) and the rods have rack teeth 65 machined along one side thereof (FIGS. 1 and 2).

In order to support the guide rails 32 for the column K of sticks on one side of the machine (FIGS. 1, 3 and 6) and guide rails 32a for a column K1 on the opposite side, the structure shown in FIGS. 3 and 6 is provided. This includes a pair of cross brackets 66 centrally secured to the lower edge of the beam 56 by screws 68 which extend through the cross brackets and shim washers 69 and are threaded into the beam 56. As seen in FIGS. 3 and 6, at opposite ends of the cross brackets 66, sleeve and bolt assemblies 72 mount guide rod mounting angles 74 to which the guide rods 32 and 32a are welded.

Yoke Assembly

The yoke assembly 34 includes a square section transverse beam 70 (FIGS. 1 and 3), the ends of which are recessed into recesses formed in slide blocks 73 (FIG. 1) and secured to the blocks by bolts 75. A slide block 73 also appears in the end view of FIG. 2.

In order to insure that both ends of the crosshead slide along the rack posts 62 without canting or binding, the ends of a shaft 76 are rotatably mounted in the slide blocks 73 (FIGS. 1 and 2) and are keyed to pinions 78 that engage with the rack teeth 65 on the post 62.

Sticks S are pushed from columns K and K1 by the blades B. As seen in FIGS. 1, 3, 6, two rows of blades B are releasably secured to the yoke beam 70 at their upper ends and project down from the beam with their lower ends disposed just above the upper ends of a column of sticks when the yoke is in its raised or retracted position shown in FIGS. 1 and 6. Although it is not clear in a view having the small scale of FIG. 1, the blades B are preferably tapered, being thicker at their upper ends than at their lower ends and are dimensioned so that the portion of each blade that is forced down through a column of sticks is thinner than the narrowest stick normally encountered in service.

As best seen in FIGS. 11–14, the lower ends 80 of the blades B are kerfed in the direction of their flat faces to form two sharp edges. This provides a biting engagement with the upper ends of the sticks and does not facilitate wedging of the lower ends of the blades between sticks, as would be the case if the lower ends were formed with a single knife edge.

The blades B are releasably attached (FIGS. 3 and 6) to the crosshead beam 70 so that in case of a jam during the insertion operation the blade attachment will accommodate upward sliding of the blades in the beam and avoid blade breakage. Elongate blade retaining strips 82 (see also FIG. 1) are notched to slidably receive blades B and are bolted to opposite sides of the beam 70 by bolts 84. The upper end of each blade has an outwardly facing detent notch 86 for receiving a ball detent 88 urged into the blade detent by a spring 90 which is retained in the strip 82 by set screw 92.

Principal Yoke Lowering Apparatus

The yoke assembly 34, along with its blades B, is lowered to displace sticks from the stick column K or from columns K and K1 by a principal lowering apparatus indicated generally at 36 and is partially by a jogging apparatus 38 with both units being shown in their initial or retracted position in FIGS. 1 and 3.

The principal lowering apparatus includes the main air cylinder unit 36 having a cylinder 96 with a threaded nipple 98 at its lower end (FIG. 3) that secures the cylinder to a slide block 100. The cylinder 96 has air lines 36a, 36b (FIG. 1) for connection to a conventional solenoid operated double acting air valve (not shown). Sliding within the cylinder 96 is a piston 102, shown in dotted lines in FIG. 1, for operating a piston rod 104, the lower end of which is threaded at 106 (FIG. 3) to a clevis 108 and made fast with a locknut 110. The clevis 108 is attached to the beam 70 by a shouldered screw 112. Surrounding the piston rod 104 and interposed between the locknut 110 and the lower side of the slide-block 100 (FIG. 3) are a washer 114, a compression spring 116 and a sleeve 118, the latter two parts being moveable through a bore formed in the frame channel 63. As can be seen from FIG. 3, if the piston rod 104 is lowered, the blade mounting beam 70 and the blades B are lowered directly by the rod, this representing the action of the main or principal blade lowering mechanism 36. However, if the slide block 100 is lowered, the block presses on the sleeve 118, the spring 116, the washer 114, the locknut 110 and the clevis 108 to also lower the blade mounting beam 70. The latter motion represents the action of the blade jogging apparatus 38.

Blade Jogging Apparatus

The function of the blade jogging apparatus is to initially partially lower the beam 70 and the blades to start the ejection of sticks from the stick column K (for example) and then to slightly retract the lower ends of each blade from the upper end of a stick or sticks previously engaged thereby, to free the lower ends of the blades from their stick. The blades can now freely spring to an optimum position against sticks adjacent to those being inserted for assuring that only a single stick will be ultimately ejected by each blade when its descent is resumed.

The jogging apparatus appears in FIGS. 1–4, 9 and 10 with FIGS. 1–4 showing the position at the start of a cycle and FIGS. 9 and 10 illustrating two subsequent stages in the operation.

Referring to FIGS. 1–4, upstanding plates 120 are bolted to the mid portion of the frame channel 63 by bolts 122 and the lower portion of each plate 120 has a vertically extending slot 124 for accommodating actuation of the slide block 100. In the preferred embodiment disclosed, the initial lowering and slight retraction of the blades, previously mentioned, is accomplished by a toggle link assembly actuated by the advance stroke of the double acting air cylinder unit 40.

The toggle link assembly has a symmetrical set of links. Each set includes a downwardly projecting toggle link 130 pivoted to the upper end of each plate 120 by a shouldered screw 132 (FIG. 3) and a spacer sleeve 134.

The lower end of each toggle link 130 is pivotally connected to an actuating yoke 136 (see also FIG. 4) by a shouldered set screw 138 (FIG. 3) and each set screw 138 is screwed into the upper end of a lower toggle link 140. The lower end of each toggle link 140 is pivoted to the slide block 100 by a shouldered screw 142 with an intervening spacer 143 that slides in a side plate slot 124.

The yoke 136 is advanced from its extreme right position, as viewed in FIG. 1, through an intermediate centered position shown in FIG. 9 and on to an extreme left or slightly overcenter position shown in FIG. 10 by the jogging air cylinder unit 40. The air cylinder unit 40 (FIGS. 1 and 4) has a cylinder 144 with a rearwardly projecting ear portion 146 pivoted at 148 to upstanding brackets 150 bolted to the upper surface of the channel beam 63. Sliding within the cylinder 144 is a piston 154 mounting a piston rod 156, the free end of which is fastened to the yoke 136. The double acting air cylinder 40 has advance and retract air lines 40a, 40b, for connection to another double acting solenoid operated air valve (not shown).

Retraction of the piston 154 is stopped by engagement of the piston with the rear wall of the cylinder 144, as seen in partial section in FIG. 1. Advance of the piston rod and yoke 136 to the slightly overcenter position of the toggle link shown in FIG. 10 is controlled by adjustment of a stop screw 158 (FIG. 4). As seen in FIGS. 1 and 3, when the main piston 102 of air cylinder unit 36 is in its uppermost position and when the jogging cylinder piston 154 of air cylinder unit 40, which operates the jogging assembly 38, is in its fully retracted position, the piston rod 104 is fully withdrawn and the sliding block 100 and crosshead beam 70 are fully raised so that the blades B are in their fully raised or retracted position with their lower ends free of the upper ends of the column K. The function of the jogging assembly 38 will be explained in detail in connection with the operational views of FIGS. 11–14 and 11A–14A.

Stick Control Assembly

The stick control assembly, indicated generally at 42, functions to support a packed column (K or K1 or both) of sticks above the molds; to accommodate insertion of spaced sticks into confections by the blades B; to restrain partially advanced sticks from following the sticks to be inserted and to restore partially advanced sticks back to their original positions in their column for subsequent insertion operations.

Referring to FIGS. 3 and 6, although the stick control system 42 is designed to control a column K of sticks on one side of the beam 56 and a column K1 (shown in phantom) on the other side of the beam, the operation of the system will be illustrated controlling only a column K in the interest of brevity. As previously mentioned, a single column of sticks is supplied in situations wherein wide or single molds are employed as shown in FIG. 1A.

As best seen in FIGS. 3 and 6, each column K, K1 of sticks is normally supported and guided on a retractable rail 150 with the rail 150 for the column K mounted on an oscillating shaft 152 and the rail 150 for the column K1 mounted on a companion shaft 152a. The shafts 152, 152a are pivotally mounted in side plates 50 (FIG. 1). The guide rails 150 can be oscillated from their stick supporting and guiding positions of FIGS. 3 and 6 to their retracted positions shown in dotted lines in FIG. 6 and in solid lines in FIG. 7. When retracted (FIG. 7) the rails 150 accommodate the projection of sticks from their packed column.

The aforesaid oscillation of the guide rail shafts 152, 152a is provided by the double acting air cylinder unit 44 (FIGS. 1 and 2), which has a cylinder 153 and a piston 154 connected to a piston rod 156. The cylinder 153 has air line connections 44a, 44b (FIG. 2) for connection to a double acting solenoid operated air valve (not shown). The lower end of the piston rod 156 mounts a clevis 158 which is pivotally connected at 159 to the upper ends of rod oscillating links 160,160a as best seen in FIG. 2.

The lower end of the link 160 is pivotally connected to an ear 162 on a collar 163 keyed to the oscillating shaft 152. The link 160a is connected to the shaft 152a by an ear 162a and a collar 163a in the same manner. In FIG. 2, the piston 154 is retracted and in this position the support rails 150,150a are in their raised or stick supporting and guiding positions shown in FIGS. 3 and 6.

When air is supplied above the piston 154, the piston rod and clevis 158 are lowered to swing the guide rails 150 out from under the lower ends of the stick columns, as shown in dotted lines in FIGS. 6 and in solid lines in FIG. 7. The blades B can now descend to displace a row of spaced sticks from the column. However, since each column of sticks is packed, frictional forces between sticks may displace one or more sticks adjacent to that being ejected by a blade. Also, in some cases, the initial longitudinal position of blades in their row may be such that one or more blades engage the ends of two sticks and hence positively displaces both from the column. The function of the auxiliary blade control mechanism 38 is to insure that each blade completely ejects a single stick from the column.

Auxiliary fixed guide rails are provided at each side of the sticks to be ejected from the column in order to maintain the intervening groups of sticks in substantially their original position in the column. These auxiliary rails are shown at 156,156a in FIGS. 6, 7 and 8 and are preferably formed by bending out the lower ends of slide plates 58, 58a that are attached to the frame crossbeam 56, as previously described.

As seen in FIG. 8, the auxiliary rails 156 are notched at 160 to accommodate the ejection of one or more sticks S, such as sticks "y" and "z" in that figure. The stick "y" in FIGS. 7 and 8 is assumed to be the stick that is ultimately inserted into an underlying confection by the air cylinder 36, whereas stick "z" has been partially displaced by frictional engagement with the stick "y" or by the initial lowering of the blades by the jogging mechanism 38. It is a function of the rail 150 and the oscillating shaft 152 to restore partially displaced sticks, such as stick "z" shown in FIGS. 7 and 8, back to their initial position in the column K.

In order to prevent sticks disposed at the notches 160 in the rail 156 from dropping out of their respective columns, a set of double acting U-shaped springs 164 (FIGS. 3, 7 and 8) is provided and as seen in FIG. 8, six springs are mounted at each rail notch 160 and these springs rest in deep notches 168 formed in the beam 56 (FIG. 7 and 8). Each spring 164 is clipped over a rod 166 that extends lengthwise through the beam 56. The lower ends of each spring 164 are re-curved to form opposed stick engaging fingers 170 that normally project partially under the lower ends of the sticks in the column when displaced sticks, such as sticks "y" and "z" in FIGS. 7 and 8 are pushed through the slots 160 in the rails 156 or 156a, the sticks "z" are restrained by the spring fingers 170, which urge the sticks against the outer guide rails 32 or 32a, depending upon which column of sticks is being acted upon. That is to say, the springs are disposed adjacent the lower ends of the sticks to retain those sticks z adjacent the sticks y from being pushed entirely out of the column with the sticks y that are engaged by the pusher blades. Rods. 172, 172a (FIGS. 7 and 8) bridge the notches 168 in the beam 156 and act as backup members for one side of each spring when its finger on the other side is pressing against a stick and only one column K is present, as illustrated in FIG. 7.

Blade Deflector Assembly

The blade deflector assembly 46 works in conjunction with the stick jogging assembly 38 to insure that extension of the piston rod 104 in the main cylinder unit 36 and the consequent complete lowering of the crosshead and the attached blades B will cause each blade to fully eject but a single stick from the packed column of sticks and into an underlying confection.

The principle element of the deflector assembly is a reciprocable blade deflecting plate 180 which has formed therein two rows of notches or apertures 182 to loosely receive the two rows of blades B. The notches 182 are seen in plan in FIGS. 5 and 6A and also appear in section in the diagrammatic operational views of FIGS. 11–14.

Deflecting plate 180 is slidably mounted on the beam 56 in a manner best seen in FIGS. 5, 6 and 6A. The plate 180 also has formed therein a row of longitudinal slots 184 (FIGS. 5 and 6A) each slot receiving a sleeve 188 surrounding a plate mounting screw 186. The screws 186 pass through apertures in an elongate retaining strip 190 (FIGS. 5–7) and anti-friction strips 192,194 are disposed adjacent upper and lower surfaces of the deflector plate 180, the strips being made of a material such as Teflon or the like.

The double acting deflecting air cylinder unit 48 has air line connections 48a, 48b (FIG. 1) for a double acting valve and can be actuated to shift the blade deflector plate 180 in either of two positions, as will be explained in conjunction with the operational views of FIGS. 11–14. In order to position plate 180, a piston rod 196 is connected to a piston 197 which slides in cylinder 198 of the air cylinder unit 48 (FIGS. 1 and 5) and the piston rod 196 is slidably mounted through an aperture formed in the upright rack rod 62 which mounts the cylinder 198. The free end of the piston rod is secured to an upstanding ear 200 secured to the left end of the deflector plate 180 as it appears in FIGS. 1 and 5.

As seen at the right of FIGS. 1 and 5, a double acting adjustable stop construction is provided for controlling the positions of the slots in the deflector plate 180 at each limit of its reciprocation. The stop construction includes an upstanding post 204 projecting from the right end of the deflector plate 180. Fixed stops are provided by an ear 206 bent up from the right end of the retaining strip 190 and by an opposed surface of the right hand rack rod 62. An adjustable stop bolt 208 connected to the post 204 provides a stop element for engagement with the ear 206 and a similar stop bolt 210 provides an adjustable stop element for engagement with the rack rod 62.

As seen in FIGS. 11–14 the deflector plate 180 mounts a blade biasing plunger at each blade receiving slot 182. A recess 220 is formed at the left of each slot as viewed in FIGS. 11–14 which recess mounts a coil spring 222 that urges a plunger 224 against the adjacent blade. This construction augments the natural spring action of the blades.

This completes a description of the major elements of the stick inserter of the present invention.

Feeder

Details of the stick feeders employed to supply the two lanes of packed sticks K and K1 to the stick inserter of the present invention are not critical to the invention, the principle requirement being that they supply packed columns of sticks to the inserter with the ends of each column pressed lightly against their respective backstops, such as the backstop 59 for the column K, shown in FIG. 1, and that gaps in the columns created by stick insertion are closed.

FIG. 15 is a diagrammatic perspective of a feeder F which can be employed to feed a column of packed sticks S to the guide rails 32 and the slide plate 58 on one side of the stick inserter. A similar feeder would be employed to feed a column K1 of sticks to the other side of the stick inserter for dual lane operation. As will be described hereinafter, a packer P is provided for compressing the end portions K of the columns of sticks within the stick insertion zone of the inserter.

The feeder F includes a special slat conveyor 230 for picking up sticks from a hopper in the manner shown in FIG. 1 of Rasmusson U.S. Pat. No. 2,953,105, Sept. 20, 1960, or in the manner employed in the aforesaid Hoyer "Stickin" machine described in the previously mentioned leaflet and known to the trade.

As best seen in FIG. 16A, the conveyor 230 has sprocket chain 232 for driving and guiding the conveyor through the hopper and around a loop (not shown). The chain links have ears 234 for slat attachment. Connected across the chain ears 234 are flat angled slats 236, each of which has a trailing edge flange 237 that picks up a stick S from the hopper and the conveyor 230 thereafter forms a row of sticks oriented in transverse, edge to edge relationship. The ends of the sticks project past the confines of the slats 236 and as seen in FIG. 16, the chain is directed to bring the ends of the sticks between helical flanges formed on right and left hand drive screws 240,242. A plate 243 supports the lower edges of the sticks as they are carried through the screws. The screw 240 is driven by a shaft 244 connected to an air clutch 246 which is driven by a sprocket 248, a chain 250, a motor pinion sprocket 252 and a motor 254.

The drive shaft 244 drives a gear 256 meshed with an equal diameter gear 258 on a second shaft 260 for driving the left hand screw 242. With the construction shown, the sticks are picked off one by one from the conveyor 230 and formed into a horizontally disposed column of sticks which column is received by guide channels 261, 262. As also seen in FIG. 15, the guide channels are given a gradual 90° twist at 264 whereupon a column K of sticks is provided with sticks arranged vertically for receipt between the guide rails 32 and the backing plate 58 of the stick inserter, previously described. The stick delivery ends of guide rails 261, 261a also appear in the plan view of FIG. 5. As the column of sticks reaches its backstop 59 (FIG. 1) the clutch 246 slips and maintains the column K of sticks in face to face packed engagement after sticks have been inserted and the blades withdrawn. Stick delivery rail 261a for a companion feeder F1 (not shown) is also shown in FIG.

5. If the confection machine is set up for single lane inserter operation, only one feeder is utilized.

Operation

In the brief summary of operation that follows it will be assumed that a single packed column K has been fed against back stop 59 (FIG. 1) of the stick inserter I for sticks to be inserted into one of the row of molds of the type shown in FIG. 1A. Under these conditions, no column K1 of sticks is fed to the inserter, both columns K and k1 being employed only for use with molds of the type shown in FIG. 1B. It will be assumed that the positions of the parts in FIG. 1 represent the start of a cycle. The steps of an insertion cycle are as follows:

1. Inserter awaiting a "cycle start" signal:

(a) The yoke 34 and the blades B are fully raised (FIGS. 1, 3, 11 and 11a). This is accomplished both by raising (retracting) the piston rod 104 in cylinder 96 of the main air cylinder unit 36, and by raising the slide block 100 (FIG. 3) and the attached main cylinder 96 by retraction of piston 154 in the jog air cylinder unit 40 (FIG. 1), to pull the toggle link assembly 38 to its right over-center position shown in FIGS. 1 and 11A.

(b) When the yoke is fully up, the control circuit is conditioned to receive a "cycle start" signal from the confection machine.

(c) The deflector air cylinder unit 48 (left of FIG. 1) for the blade deflecting assembly 46 has shifted the deflector plate 180 to its left position as determined by stop 208, so that the right wall of each slot 182 (FIG. 11) deflects the lower end of the associated blade B to the left. As seen in the schematic diagram of FIG. 11, the lower end of a blade is deflected by a small distance "b" (about 0.040" to 0.060") to the left of a face of stick "x" the plane of the stick face being indicated by the line f—f. In the relative position of the column K of sticks and the blades shown in FIG. 11, this action of the deflecting plate brings the kerfed lower end 80 of the blade shown to a position wherein it happens to straddle the upper ends of two sticks "y" and "z".

(d) The rails 150 have been raised to their upper, stick supporting position by the air cylinder unit 44 (seen at the right of FIG. 1 and in FIG. 2). This rotates the shafts 152,152a by the links 160,160a seen in FIG. 2 to bring rails 150 to their raised positions shown in FIGS. 3 and 6.

A stick inserting cycle proceeds as follows:

2. (a) A "cycle start" signal is received from the confection machine.

(b) The moveable stick support rails 150 (FIG. 6) are shifted to their dotted line positions to clear the bottom of the sticks, which shifting motion is accomplished by lowering of piston 154 in the air cylinder unit 44 (FIGS. 1 and 2) with the attendant rotation of the rail shafts 152,152a.

(c) The stick restraining springs 164 (FIGS. 7 and 8) will prevent sticks from falling out through the notches 160 in the fixed guide rails 58, as can be seen at the left side of FIG. 7.

3. (a) The jogging air cylinder unit 40 (FIGS. 9 12 and 12A) is actuated to move the toggle link jog assembly 38 to a position where the link pivots are in a straight line (on center) position. This action lowers the slide block 100 and the attached main cylinder 96 by a distance "d" (FIG. 12) of about ⅜ inches in the present example. Lowering of block 100 lowers the clevis 108 (FIG. 3) by pushing down the sleeve 118, the spring 116 and the washer 114, whereupon the yoke beam 70 and the blades B attached thereto are lowered or "jogged", as previously described in connection with FIG. 12. This initial lowering of the blades, in the example given, partially displaces two sticks "z" and "y" but since the blade is held clear of an adjacent stick "x" by the small distance "b" created by positioning the deflector plate 180 to the left, the blade exerts no force on the stick "x". Even if blades to each side of the sticks "z" and "y" are partially lowered due to frictional engagement with the latter sticks, the lowering thereof is frictionally restrained by the action of the springs 164 (FIGS. 7 and 8). Only those sticks disposed above the notches 160 in the fixed rails 156 can be lowered to any significant extent, the intermediate groups of sticks being restrained by the fixed rails 156,156a.

(b) The jog air cylinder unit 40 continues to full advance (FIGS. 10, 15 and 10A). This pushes the toggle links 38 slightly over-center and raises the slide block 100, the attached main cylinder 96 and the cylinder piston rod 104 by the small distance "g" shown in FIG. 13. This distance, in the present example is about 1/16 inches. The lower end 80 of the blade shown is now clear of the upper ends of the previously engaged sticks "z" and "y".

4. (a) The deflector cylinder unit 48 (left of FIG. 1) is now actuated to push the deflector plate 180 to the right (FIG. 13) so that the blades are not restrained by a right wall of the notches or slots 182 formed in the deflector plate.

(c) Each blade can now spring back until it engages the face "f" of an adjacent stick "x". This action is augmented by the spring loaded plungers 224. The lower edge 80 of each blade is now aligned with the upper end of stick "y" only.

5. Motion of the deflector plate to the right actuates the yoke cylinder unit 36 in a manner to be described with reference to the circuit diagrams.

6. The yoke cylinder unit lowers the piston 102 (FIG. 1), the piston rod 104, clevis 108 (FIG. 3), yoke 70 and the row of blades B to bring the yoke to the dotted line position of FIG. 3. The row of blades B is now lowered, providing ejection of the stick "y" (FIG. 14) and its companion sticks (not seen) along the column K into the underlying confections. In FIG. 14, the ejection of stick "y" is in progress while the partially displaced stick "z" is being held in place by the springs 164 (FIGS. 7 and 8).

7. When the yoke is fully down, circuits are energized to raise the yoke, after which other operations are performed. First the piston of the main cylinder unit 36 is actuated to raise the yoke 70 and to withdraw the row of blades B from the column K of sticks.

8. (a) When the yoke is fully up; the deflector cylinder 48 resets the deflector plate to the left as shown in FIG. 11.

(b) The jog cylinder unit 40 is actuated to pull the toggle links 38 back to their initial right overcenter of FIGS. 1 and 11A, thereby resetting the blades to their initial fully raised position shown in FIG. 1.

(c) The rail cylinder unit 44 (FIGS. 1 and 2) is actuated to raise the piston 154 and the attached piston rod 156 to rotate shafts 152,152a, thereby bringing guide rails 150 from their dotted line positions in FIG. 6 back to their solid line positions in that Figure, which positions are also shown in FIG. 3. This action pushes up any partially displaced sticks (such as stick "z", FIGS. 7 and 13) back into alignment with the remaining sticks in the column K.

9. When the rails 150 are reset, the circuit is partially conditioned for another cycle on signal from the confection machine.

10. Feeding pressure on the column K by the packer P (as described hereinafter) closes the gaps between groups of sticks formed by withdrawal of the blades after ejection of inserted sticks from the column and the apparatus is completely armed for a new stick insertion cycle.

Packer

Referring to FIG. 15, the packer P (only part of which is shown) is mounted between the feeder F and the stick insertion zone of the stick inserter I. The packer positively closes gaps in the end portion K of the column of sticks in the stick insertion zone after the inserter blades have been retracted therefrom and packs or compresses the end portion of column of sticks so that all of the sticks are properly oriented for an insertion cycle. Referring to FIG. 19, the packer P includes a pusher device 271 that is mounted on a frame structure 270 that is, in turn secured to one side plate 50 of the inserter. Mounted on the frame 270 is a U-shaped bracket 272 having projecting arms 274 and 276. Connected between these arms is a longitudinal rail 277 along which the pusher device 271 can reciprocate. The arms 274,276 can also mount the stick guide channels 261, previously described. The pusher device 271 includes a carriage 280 that is reciprocable upon the rail 277. The carriage is formed of opposed U-shaped plates 282,284 which are open at the top, as best seen in FIG. 20. Four shouldered bolts 286 (FIGS. 20 and 22) mount two rollers 290 disposed at the upper edge of the rail 277 and two rollers along its lower edge. With this construction, the carriage 280 is firmly guided for reciprocation along the rail.

The end portion K of the column of sticks is frictionally gripped by the pusher device 271 from opposite sides and the pusher device 271 is then extended or advanced to pack the sticks in such end portion within the stick insertion zone. On one side of the stick column, a gripper 294 is mounted on a clamp arm 298 and on the opposite side a gripper 300 is mounted on a clamp arm 302. Both grippers are rotatably mounted on their respective arms to accommodate re-orientation of the sticks as the packing operation takes place. For example, the grippers 294 and 300 each comprise a stick engaging pad 304 formed of rubber or other friction material mounted on a disc 306, the disc being integral with a shaft 308. The shaft 308 is retained in the associated clamp arm 298 by a snap ring 310.

The grippers 294,300 are clamped against the column adjacent the upstream end of the column portion K by a self-centering air cylinder arrangement. In order to mount the opposed clamp arms 298,302 on the pusher carriage 280, pivot pin brackets 312 and 314 (FIGS. 19 and 22) are mounted on the carriage by bolts 286. The aforesaid brackets have inwardly projecting legs which extend into the carriage and mount a clamp-arm pivot-pin 316 (FIGS. 21 and 22), the axis of which lies in the midplane of the rail 277. The lower end of clamp arm 298 mounts spaced laterally extending levers 318,320 (FIG. 22), and the intermediate portions of levers are pivoted on the pivot pin 316. The opposed clamp arm 302 has an oppositely extending lever 322 (FIGS. 21 and 22) which is also pivotally mounted on the pivot pin 316.

A double-acting pneumatic cylinder 324 is provided to close the grippers 294,300 against the sticks therebetween. The piston of cylinder 324 magnetically operates reed switches L7 and L9 forming part of the control circuit to be described. An ear 326 on the lower end of cylinder 324 is pivoted at 328 to the levers 318,320 of the clamp arm 298 (FIGS. 21 and 22). As seen in FIGS. 19 and 21, the piston rod 320 of the air cylinder mounts a clevis 332 which is pivoted at 334 to an ear 336 projecting from the upper end of the clamp arm 302. Thus, when air is applied to extend the air cylinder, oppositely acting forces are exerted on the ear 336 for one gripper and the levers 318,320 for the other gripper. This brings the grippers together, causing them to clamp against several sticks in a manner which permits self-centering of the grippers.

FIG. 21 shows the grippers 294 and 300 in their open position, and FIG. 21A shows the grippers closed upon the column of sticks. When the grippers are opened, a stop bolt 340 mounted on an ear 341 projecting from the gripper arm 298 engages the housing of a brake cylinder 342 mounted on the carriage 280. Also when opened, the leg 322 of the gripper arm 302 engages a stop bolt 343 threaded into a flange 344 that projects from the carriage plate 284. A limit stop 346 (FIGS. 21 and 21A) is also threaded to the projection flange 344 for limiting the pivoting action of the levers 318,320 extending from the gripper arm 298 (see FIG. 21A). The brake cylinder 342 is supplied with air under pressure when the packer is in its extended position. This isolates the end portion K of the column of sticks packed by the packer from the feeding force exerted thereon by a column of sticks being fed by the stick feeder F.

The brake mechanism will now be described in greater detail. The brake cylinder 342 has a cylinder portion 350, which is externally square and which is secured to the carriage plate 282 by four bolts 352 (FIGS. 20 and 23). Bolts 352 also mount a carriage reciprocating plate 354. The brake cylinder has an air piston 356 (FIG. 21) that can be forced into braking engagement with a side face of the rail 277. Braking is caused by supplying air under pressure to a line 358 connected to the brake cylinder. FIG. 20 shows the packer carriage 280 in its retracted position with the brake piston 356 in dashed lines, in which position the brake is released. The brake piston 356 is also shown in phantom lines in FIG. 20, in which position the carriage has been extended or advanced to pack the column of sticks. The brake is applied in this position of the packer to grip the rail 277 to thereby hold the carriage in its extended position.

In order that the carriage 280 of the packer can be extended to pack the end portion K of column of sticks and thereafter retracted to its reset position, the plate 354 mounted on the brake cylinder is formed with an upwardly extending arm 360. The arm 360 is engaged by double-acting pneumatic cylinder 362 (FIGS. 19 and 20) which is mounted on the frame leg 276 by a clamp nut 364. The piston rod 356 of cylinder 362 mounts a clevis 368 which is pivoted at 370 upon the upper end of the carriage arm 360. When air is applied to cylinder 362 to extend the piston rod 366, the packer is moved from its retracted position shown in FIGS. 19 and 20 to its extended position, the extended position of gripper 294, being shown in phantom outline in FIG. 20. Of course, before the packer is thus extended, air cylinder 324 has been actuated to close the grippers to clamp several sticks, as described hereinbefore. When air is applied to the opposite end of the air cylinder 362, the carriage is retracted to the position shown in FIGS. 19 and 20.

Reed switches L7 and L9 (FIG. 21) are magnetically operated by the piston of the gripper cylinder 324 in a manner to be described presently.

Control Circuit

The function of the control circuit is to carry out the sequence of inserting and packing steps in a manner wherein the operations are completed in the proper sequence without interference of parts, jamming or breakage of sticks.

In the control circuit to be described, various relays and associated solenoid actuated air valves are controlled by the closing and opening of reed switches, each switch being closed by the positioning of a magnet adjacent thereto and being opened when the magnet is moved from the vicinity of the switch. These reed switches, which are well known in the art, are quite sensitive in that only a fraction of an inch movement of a magnet is sufficient to either open or close a switch. Since the details of the control circuit being described are not critical to the present invention, and since the required operational steps of the apparatus have been described in detail, the operation of the control circuit will be described briefly in connection with the simple schematic diagrams of FIGS. 17 and 18.

Switch Arrangement

The mounting of reed switches L1–L5 which cycle the inserter is shown in FIG. 1 and these reed switches are also shown in the circuit diagram of FIG. 17.

Referring to FIG. 1, a yoke control reed switch L1 is mounted on the frame cross beam 63 and is closed by a magnet M1 mounted on a slide block 73 of the yoke when the yoke and blades are fully raised. As also seen in FIG. 1, a reed switch L5 is mounted on the frame, as by mounting on the rail cylinder unit 44, and is closed by the magnet M1 when the yoke is fully lowered, as indicated in dotted lines.

The rail cylinder unit 44 seen at the right of FIG. 1 is of a special type manufactured by the Bimba Manufacturing Company of Monee, Ill. The magnet that closes and opens a reed switch L2 on the rail cylinder unit 44 is mounted to move with the piston and piston rod and is not shown in the drawings.

The jog cylinder unit 40 is also a Bimba unit and mounts a reed switch L3. The stepping cylinder unit 48 is another Bimba unit which mounts a reed switch L4.

Cylinder Control Valves

Each of the air cylinders is actuated by a double acting, solenoid operated air valve connected to the air lines for each cylinder which have been previously described. These valves are conventional in construction and are not illustrated. Valve solenoids are, however, shown in the circuit diagram of FIG. 18. The solenoids V30 and VO3 control the valve for the rail cylinder unit 44. Solenoids V20 and VO2 control the valve for the jog cylinder unit 40. Solenoids V40 and VO4 control the valve for the deflector cylinder unit 48 and solenoids V10 and VO1 control the valves for the yoke cylinder unit 36. One solenoid of each pair positions the associated valve for moving its air cylinder piston to one extreme position and vice-versa.

Control Circuit Operation

1. Awaiting Cycle Start Signal

As described in the description of the operation of the inserter, the position of the parts when awaiting a Cycle Start signal is shown in FIG. 1. Referring to FIG. 17 an OFF-ON switch SW is closed energizing the 12 volt DC power supply. When the yoke 34 is raised to its up position, the magnet M1 closes the reed switch L1 (FIG. 1) and energizes relay coil CR1. As shown in FIG. 17, the other switches L2–L5 are open. Referring to line 1 of the ladder diagram of FIG. 18, normally open contact CR1-1 is closed thereby conditioning the circuit for initiating a cycle upon receipt of a "Cycle Start" signal from the confection machine which will close normally open contacts CR29-1. A normally open contact CR1-2 in line 6 of the diagram is also closed at this time and a contact CR6-1, to be explained presently, is also closed. None of the valve solenoids shown in FIG. 17 are energized.

2. Start Cycle

A Cycle Start signal from a confection machine sequencer closes contact CR29-1 in line 1 of the diagram of FIG. 18, thereby energizing relay coil CR22 through CR1-1 and CR6-1. This closes normally open contact CR22-1 in line 2 of FIG. 18 and energizes air valve solenoid V30 through normally closed contact CR5-1. This can only happen when the yoke is up and CR1 is energized. When solenoid V30 is energized, the air control valve (not shown) for rail cylinder unit 44 is operated to lower the rails 150 (FIG. 6). Once the piston in cylinder unit 44 (and this applies to the other air cylinders as well) is shifted by energizing its valve solenoid V30, it remains in its shifted position until the companion solenoid VO3 for the control valve is energized to reset the cylinder back to its original position. The normally closed contact CR22-2 in line 6 of the diagram is opened when relay coil CR22 is energized, insuring that no power can reach re-set solenoids VO4 and VO3 at this time.

3. When the piston of the rail cylinder unit 44 is fully down it closes switch L2 (FIG. 17), energizing relay coil CR2. Referring to FIG. 18, this closes contact CR2-1 in line 3 energizing the jog solenoid V20 through normally closed contact CR5-1 and closed contact CR22-1 for moving the piston of jog cylinder unit 40 to the left. Also, in line 6 of FIG. 18, although normally open contact CR2-2 closes, normally closed contact CR22-2 remains open because relay CR22 is still energized, holding solenoids VO4 and VO3 in line 8 de-energized. If relay CR2 is not energized by the rail cylinder unit 44 for closing contact CR2-1 in line 3, operation of the stick inserter cannot proceed.

4. When the piston of jog cylinder unit 40 moves full left (FIGS. 10, 15 and 13A), it closes switch L3 (FIG. 17) energizing relay coil CR3. Switches L1 and L2 remain closed. Referring to FIG. 18, CR3 closes normally opened contact CR3-1 in line 4 thereby energizing solenoid V40 for the deflector plate cylinder 48 through previously closed normally open contacts CR2-1, CR22-1 and normally closed contact CR5-1. Normally closed rail reset contact CR3-2 in line 7 is opened. The valve controlled by the solenoid V40 is actuated to cause the piston in cylinder unit 48 to move the deflector plate to the right (FIG. 13) so that the blades are now free to spring against the faces of sticks adjacent to those about to be inserted. Switches L1 and L2 (FIG. 17) remain closed, and normally closed contact CR22-2 in line 6 of FIG. 18 remains open because CR22 is still energized.

5. When the piston of deflector cylinder unit 48 has moved the deflector plate 180 fully right (blade release position) switch L4 is closed (FIG. 17) energizing relay coil CR4. As seen in line 5 of FIG. 18, normally open contact CR4-1 is now closed energizing the valve solenoid V10 through CR5-1, CR22-1 and CR2-1 for the air cylinder unit 36 that controls the yoke and the cylinder unit piston now moves the yoke and associated blades down to eject sticks from their column. Normally closed contact CR22-2 in line 6 of FIG. 18 is still open because CR22 is still energized.

6. As the yoke moves down it opens switch L1 and relay coil CR1 is de-energized (FIG. 17). Switches L2-L4 remain closed.

In FIG. 18, line 1, normally open contact CR1-1 now re-opens, removing power for solenoids V30, V20, V40 and V10, by de-energizing relay coil CR22 and re-opening normally closed contact CR22-1, line 2 of the diagram. Also, at about this time the Cycle Start signal pulse from the confection machine that closed contact CR29-1 in line 1 of FIG. 18 ends and contact CR29-1 likewise opens, further isolating the aforesaid solenoids. In line 6 of FIG. 18, normally closed contact CR22-2 re-closes but normally open contact CR1-2 in the same line, which was previously closed when the yoke was up, reopens and contact CR2-2 in line 6, which was previously closed, remains closed. However, the opening of contacts CR22-2 and CR1-2 (yoke moving down) isolate valve solenoids VO4 and VO3.

7. When the yoke is fully down, the magnet M1 (as shown in dotted lines in FIG. 1) closes the switch L5 and energizes the relay coil CR5 (FIG. 17). Yoke switch L1 remains open and switches L2-L4 remain closed. Energizing CR5 opens the normally closed contact CR5-1 in line 2 of FIG. 18 thereby insuring that no power can be applied to solenoids VO4 and VO3 at this time. Solenoids V30, V20, V40 and V10 have been previously isolated by CR22-1, as described. Also, when the yoke is fully lowered, normally open contact CR5-2 in line 8 of FIG. 18 is closed, energizing the valve solenoid VO1 which shifts the air valve for the yoke air cylinder unit 36, and initiates raising of the yoke and its attached blades. Simultaneously, air solenoid VO2 (line 9) for the air valve of the jog cylinder unit 40 is energized, which causes its piston to move to the right to its original reset position shown in FIG. 1. This opens switch L3 in FIG. 17, de-energizes relay CR3 and re-closes contact CR3-2 in line 7 of FIG. 18.

8. When the yoke is fully up, the magnet M1 again closes switch L1 (FIG. 17) which re-energizes the relay coil CR1. The rail release switch L2 remains closed. Referring to FIG. 18, line 2, normally open contact CR5-1 recloses when the yoke reaches its fully up position but CR29-1 (Cycle Start signal from confection machine) remains open and relay CR22 remains de-energized, leaving contact CR22-1 in line 2 open and leaving contact CR22-2 in line 6 closed. However, when relay coil CR1 was energized by raising the yoke fully up, normally open contact CR1-2 in line 6 is closed, thereby energizing valve solenoid VO4 for the deflector plate cylinder unit 48 through normally closed contact CR22-2 and previously closed normally open contact CR2-2. Thus, the aforesaid closing of CR1-2 shifts the deflector plate 180 to its left or reset position shown in FIG. 11A. This opens switch L4 in FIG. 17, de-energizing CR4. Also, normally closed contact CR3-2 shown on line 7 of FIG. 18 has reclosed (step 7), energizing the rail reset solenoid VO3, which causes the valve for the rail cylinder unit 44 to raise the rails to their upper position shown in FIG. 6.

When the yoke started to raise, switch L5 opened, de-energizing relay CR5 and restoring its contacts to their normal conditions shown in FIG. 18. In lines 8 and 9 of FIG. 18, when the yoke is raised, normally open contact CR5-2 reopens thereby de-energizing valve solenoids VO1, VO2, and these valves are conditioned for receiving air on energization of solenoids V10 and V20 in the next cycle. Normally closed contact CR5-1 in line 2 of FIG. 18 re-closes for partially arming valve solenoids VO4 and VO3.

9. When the piston of rail cylinder unit 44 is in its fully raised position, restoring the rails to their uppermost positions shown in FIG. 6, the switch L2 (FIG. 17) is opened, thereby de-energizing relay coil CR2. Switches L3-L5 have been opened previously, and the yoke switch L1 has been closed. Referring to line 3 of FIG. 18, de-energizing relay CR2 re-opens normally open contact CR2-1 and de-energizes the valve solenoids V20, V40 and V10. At the same time, normally open contact CR2-2 in line 6 of FIG. 18 is reopened, de-energizing the valve solenoids VO4 and VO3. Solenoids VO1 and VO2 in lines 8 and 9 of FIG. 18 were previously de-energized by the re-opening of normally open yoke contact CR5-2.

Thus, all the valve solenoids are de-energized and contact CR29 in line 1 of FIG. 18 is opened, awaiting another Cycle Start pulse from the confection machine. However, since the yoke is up, the contact CR1-1 is closed, thus arming the circuit for receipt of another Cycle Start pulse to close contact CR29-1. The control circuit insures that the various operations take place in sequence and that if a given operation is not completed, the inserter will not perform subsequent operations and hence will come to a stop.

Loose Pack Sensing

Circuit means are provided in order to insure that fully packed column K and K1 of sticks are stored in the inserter before an insertion cycle is initiated. For this purpose a spring plunger switch L6 (FIG. 1) is mounted in a recess in backstop 59 for column K and a companion switch L6A (not visible in FIG. 1) is fitted to the backstop 59a for column K1.

The switches L6 and L6A are in series, as shown in FIG. 17 and when both are closed by columns of sticks they energize a relay coil CR6. Referring to FIG. 18, when relay CR6 is energized, normally open contact CR6-1 in line 1 of FIG. 18 is closed, thereby completely arming the power supply circuit. If a column of sticks is not full or is not fully packed, its associated switch L6 or L6A will be open, de-energizing relay CR6, thereby allowing normally open contact CR6-1 to open. Although a cycle in process will be completed, a new cycle cannot start until contact CR6-1 is re-closed. If the stick inserter is to operate as a single lane machine, the appropriate switch L6 or L6A is merely shunted out of the circuit to simulate its closed position.

Packer Operation

A detailed description of the packer operation will be provided in connection with the circuit diagrams of FIGS. 17 and 18, previously referred to in regard to operation of the inserting mechanism. These figures show the condition of the circuit elements when the inserter yoke 34 is up, the brake cylinder 342 is released and the packer carriage 280 has been retracted by cylinder 362 to its reset position. The diagrams of FIGS. 17 and 18 show limit switches and relays for both single and double lane packaging. A packer is associated with each lane but a single set of solenoid actuated air valves controls both packers.

1. Extend Packer Circuit Readied (a) When the yoke 34 is fully raised and as previously described, switch L1 is closed (FIG. 17) energizing relay CR1. This closes normally open contacts CR1-2 in line 6 of FIG. 18. The "insert complete" relay CR23 (line 7A) is energized through normally closed contacts CR5-1 (line 2) and CR22-2 (line 6) as well as through normally open contact CR1-2 (now closed) and normally closed contact CR2-3 in line 7A. With a relay CR23 thus energized, normally open contact CR23-1 in line 13 is also closed, partially arming the "extend packer" valve solenoid V6. When the relay CR1 was energized as just described, normally open contacts CR1-1 in line 1 and CR1-2 in line 6 of FIG. 18 are closed as described in step one of the aforegoing description, Inserter Control Circuit Operation.

(b) When the packer carriage 280 was retracted by cylinder 362, in a manner to be described presently, a "packer retracted" switch L8 (FIG. 17) was closed. Since two packers are provided for dual lane operation, a companion switch L8A in series with L8 is also closed when the second packer is retracted, it being understood that both packers retract regardless of whether they are to pack a lane or not. Thus, when both switches L8 and L8A were closed the "packer retracted" relay CR27 was energized.

2. Grippers Engaged (a) With the "packer retracted" relay CR27 energized, as in step 1(b), normally open contact CR27-1 in line 12 of FIG. 18 closes and energizes the "engage grippers" valve solenoid VO7 for air cylinder 324 causing the latter to engage several sticks between the grippers, 294 and 300.

(b) When the grippers of both packers are moved together for engaging the side edges of several sticks therebetween, the limit switches L9 and L9A (FIG. 17) close, energizing the "grippers engaged" relay CR28, for arming an "extend packer" solenoid, as will be described. The packer system is now ready for packer extension. In single lane operation wherein no sticks are fed to one lane, the grippers of the packer at an empty lane close as described above, even though no sticks are in their lane and this is true for succeeding operations.

3. Extend Packer (a) With the yoke 34 up, the blades B are withdrawn from the column of sticks and the resultant gaps loosen the column whereupon the "pack tight" switches L6 and L6A (one for each lane) FIG. 17 open. In single lane operation, one of these switches is always open and must be shunted by a circuit (not shown) to shift control to the utilized lane. Opening of either switch L6 or L6A de-energizes relay CR6 (FIG. 17) and opens normally open brake relay contact CR6-2 in line 15 of FIG. 18. This de-energizes brake relay CR25 in order to release the packer brake cylinder 342 and free the respective packer carriage. With relay CR25 de-energized, normally open contact CR25-2 in line 16 of FIG. 18 opens, brake valve solenoid V8 is de-energized and the associated air valve (not shown) releases the brake cylinder by releasing air pressure therefrom.

(c) When the grippers 294 and 300 engage the side edges of the several sticks therebetween, relay CR28 was energized (step 2b) and normally open contact CR28-1 in line 13 of FIG. 18 was closed. This energizes the "extend packer" valve solenoid V6 through previously closed contact CR23-1 (step 1a) and normally closed contact CR25-1 (line 13 of FIG. 18). Energization of valve solenoid V6 causes the cylinder 362 to advance the closed grippers 294 and 300 toward the stick inserter backstop figure 59 (FIG. 1) to thereby pack the portion stick column within the stick insertion zone of the inserting apparatus. Both packers are extended, even in single lane operation.

(d) When the pusher devices 271 of both packers are extended and the end portions of one or both columns are firmly packed with a pressure corresponding to the air pressure supplied to cylinder 362, the brake cylinder 342 is extended to hold the carriage 280 in such position, thereby controlling the pressure exerted on the sticks during insertion. When the pusher devices are so extended, left and right lane "packer extended" switches L10, L11 (FIG. 17) are closed, energizing relay CR9. This arms the control circuit for a packer reset operation by closing normally open contact CR9-1 in line 14 of FIG. 18.

4. Apply Packer Brake (a) When the extension of the pusher device 271 and its grippers 294 and 300 packs both columns of sticks against their respective back stops 59, the "pack tight" switches L6 and L6A (FIG. 17) reclose and energize relay CR6. These switches are in series so that in dual lane operation, both lanes must be packed. In single lane operation the empty lane switch is shunted out by means not shown. Energization of relay CR6 closes normally open contact CR6-2 in line 15 of FIG. 18 and energizes brake relay CR25 through normally closed contact CR26-2.

(b) With relay CR25 energized, the normally open contact CR25-2 in line 16 of FIG. 18 closes, energizing brake valve solenoid V8 and causing air under pressure to apply the brake cylinder 342. Also, normally closed contact CR25-1 in line 13 of FIG. 18 opens, de-energizing the "extend packer" valve solenoid V6, so that air is released from the extension end of cylinder 362, readying the cylinder for a reset operation. However, the brake cylinder holds the carriage of the pusher device in its extended (packing) position and isolates the packed column portion that is upstream from the engaged sticks from force exerted by the feeder F on the incoming column of sticks.

(c) The energization of relay CR6 (step 4a) also closed contact CR6-1 in line 1 of FIG. 18 and armed the control circuit for acting upon a new "cycle start" signal from the confection machine, when such signal is received.

At this point it is noted that only one valve solenoid VO, V5, VO7, V6 and V8 is shown for the various packer functions in FIG. 18. However, it is to be understood that for each packer valve solenoid there is an air valve connected to a source of air under pressure, and the pressure output or outputs of these valves are connected in parallel to the cylinders or the like for two packers for dual lane operation of the inserter. The porting of solenoid controlled air valves for performing the simple "pressure on" and "pressure relieved" operations required is a mere matter of conventional engineering, and thus the air valve details are omitted as being unnecessary.

5. Packer Reset

(a) Yoke Position

After every stick column packing operation, the cylinder 362 of each packer is extended and must be retracted or reset to initiate a new packing operation. The packer reset cycle is initiated when the yoke 34 reaches its fully down position and closes the "yoke down" switch L5 (FIG. 17) to energize relay CR5. Relay CR5 closes normally open contact CR5-2 in line 8 of FIG. 18 and energizes the "yoke up" valve solenoid VO1 for cylinder 36 to bring the yoke up and withdraw the blades from the column.

(b) Release Grippers

When the normally open contact CR28-2 in line 14 of FIG. 18 was closed by the "grippers engaged" relay CR28 (step 2b) and normally open contact CR9-1 was closed by the "packer extended" relay CR9 (step 3c), the "packer reset" relay CR24 in line 14 of FIG. 18 is energized. This closes normally open contact CR24-1 in line 10 of FIG. 18 for energizing the "release grippers" valve solenoid 70 so that the gripper cylinder 324 receive air under pressure at its gripper release end to release the grippers, providing relay CR5 is energized by switch L5 when the yoke was in its down position. As seen in line 14 of FIG. 18, when the "packer reset" relay CR24 was energized, as just described, normally open contact CR24-2 which shunts contact CR9-1, thereby latching relay CR24 regardless of the condition of the "packer extended" switches L10 and L11 (FIG. 17), the relay CR9 and its contact CR9-1.

6. Retract Packer

When the cylinders 324 disengage their respective grippers 294 and 300, "grippers disengaged" switches L7 and L7A (FIG. 17) are closed by their respective packers, thereby energizing the relay CR26. Both switches are closed in single lane as well as in two lane operation. Relay CR26 closes normally open contact CR26-1 in line 11 of FIG. 18 and energizes the "retract packer" valve solenoid V5. The cylinders 362 now retract or reset their respective packers.

7. Close Grippers (a) When the yoke 34 is fully elevated (step 5a), the "yoke down" switch L5 (FIG. 17) is opened, thus de-energizing relay CR5 and opening normally contact CR5-2 in line 8 of FIG. 18. This de-energized the "release grippers" valve solenoid V7O in line 10 of FIG. 18. The aforesaid action readied the control circuit for re-engaging the grippers upon retraction of the pusher devices.

(b) When both cylinders 50 for both pusher devices are fully retracted, the "packer retracted" switches L8 and L8a (FIG. 17) close, energizing relay CR27. This closes normally open contact CR27-1 in line 12 of FIG. 18 and energizes the "engage grippers" valve solenoid VO7, causing cylinders 324 to force the grippers to clamp upon their respective columns of sticks.

(c) When the grippers 294, 300 are engaged upon their respective columns, the "grippers engaged" switches L9 and L10 (FIG. 17) are closed, energizing relay CR28 in preparation for a new packing cycle, as in steps 1 and 2 previously described.

Referring to switches in FIG. 17 it will be seen that the "grippers disengaged" switches L7, L7A, the "packer retracted switches" L8, L8A and the "grippers engaged" switches L9, L9A for the two packers are wired in series. Accordingly, the operations of both packers must be completed before the associated relays are energized and a cycle can continue. In single lane operation, the idle packer will close these switches even though no column of sticks is present. However, it will be seen that the "packer extended" relay CR9 (FIG. 17) can be energized by the closing of either switch L10 or switch L11 because these switches are connected in parallel. This action is provided because in dual lane operation, the amount of extension of the respective pusher devices 271 against the columns of sticks, depends upon the elasticity of the respective end portions of the columns being packed: one packer might not reach its full extent when the other is fully extended even though both columns of sticks are packed.

Although various relays are employed in the control circuit just described, in accordance with current electrical practice a programmed logic circuit can be substituted for the relays, employing the same control limit switches or their equivalent.

Although the best mode contemplated for carrying out the present invention has been herein shown and described, it will be apparent that modification and variation may be made without departing from what is regarded to be the subject matter of the invention as defined in the appended claims.

What is claimed is:

1. Apparatus for forming frozen molded confections, said apparatus being of the type comprising a plurality of shiftable molds each formed with a row of generally rectangular section mold cavities and a stick inserter for simultaneously inserting flat faced sticks into the confections in the mold cavities, the mold cavities in a row being disposed transversely of the row axis, said stick inserter comprising means for forming a packed column of sticks, said sticks being disposed so that their flat faces are also transverse to the row axis and the sticks are located in a vertical plane and directly above the mold cavities and means for inserting sticks directly from the column into the mold cavities of a row.

2. Stick inserting apparatus for simultaneously pushing a row of elongate sticks into confections carried by a row of underlying mold cavities, said apparatue comprising means for forming a column of vertically disposed sticks in aligned, closed engagement, blade means for simultaneously pushing spaced individual sticks from said column and into confections in the underlying mold cavities and means for reciprocating said blade means for alternately pushing the sticks and for retracting said blade means from the column.

3. The apparatus of claim 2 wherein said blade means comprises a row of thin, flat faced, elongate flexible blades within their flat faces disposed normal to the row axis and with their lower ends disposed for pushing the sticks.

4. The apparatus of claim 3 comprising blade deflecting means shiftable for slightly deflecting the blades of said row along the row axis before the blades engage the sticks, said blade reciprocating means comprising blade jogging means for initially partially advancing the blades and associated sticks and then slightly retracting the lower blade ends from the ends of sticks engaged during said initial blade advance for freeing each blade to spring against the face of a stick adjacent to that being advanced, and means for shifting said blade deflecting means to accommodate springing of each blade so that one side thereof engages an adjacent stick before completion of its stick insertion motion.

5. Stick inserting apparatus for simultaneously inserting a row of elongate, thin, flat faced sticks into confections carried by a row of molds; said apparatus comprising a row of spaced stick pushers above the molds and means for lowering the pushers for inserting sticks into the confections; the improvement comprising means for guiding and maintaining a dense column of vertically disposed sticks below the pushers with the flat faces of the sticks in forceable packed engagement, said pushers each comprising an elongate thin blade, a yoke for mounting the upper ends of said blades with the blades projecting vertically down toward the upper ends of sticks spaced along the packed column, and yoke reciprocating means for lowering the yoke to cause the lower ends of said blades to push spaced sticks out of their column and into confections in underlying molds, said reciprocating means raising said yoke to restore the lower ends of the blades to their positions above the packed column of sticks while leaving groups of sticks between the spaces occupied by the inserted sticks.

6. The apparatus of claim 5, comprising means for pressing on said column for closing said spaces and re-forming said groups of sticks into a packed column.

7. The apparatus of claim 5, comprising a rectractable rail for normally supporting the lower ends of the sticks in the column, means for retracting said rail for accommodating stick insertion and means for returning said rail to its stick supporting position, return of said rail restoring sticks that were partially displaced during stick insertion back to their original positions in the column.

8. The apparatus of claim 5; comprising fixed stick restraining rail means below said sticks, said rail means having gaps below said blades.

9. Apparatus for simultaneously inserting a plurality of flat sticks into confections comprising: guide means for supporting a continuous column of sticks with their ends adjacent to a row of spaced confections into which the sticks are to be inserted, a back stop for the column at one end of said support means, means for packing the column of sticks in face-to-face abutment with one another, an elongate yoke member, a row of pusher blades, means for mounting said blades on said yoke member in parallel relationship with intervals therebetween that are equal to the spacings between the confections, means for driving the yoke member to advance the blades and simultaneously force a plurality of sticks from the packed column and into the confections and to thereafter retract the yoke member so that the blades are withdrawn from the column of sticks.

10. The apparatus of claim 9; comprising means for shifting said blade deflecting plate in the opposite direction when the blade ends have been raised to clear the sticks to accommodate springing of the lower ends of the blades against the sides of neighboring sticks that were not engaged by the blades during said partial lowering to thereby assure that each blade will push only a single stick from the column of sticks.

11. The apparatus of claim 9; wherein the blades are flexible along the extent of the row, said apparatus further including a shiftable blade deflecting plate having a plurality of slots formed therein each of which receives a blade, means for shifting the plate in one direction longitudinally of the row of blades for slightly deflecting the free ends of the blades from their normal positions; said means for driving the yoke member including blade jogging means for first partially lowering the yoke member so that the blades project partially into the column and for thereafter slightly raising the yoke member so that the ends of the blades clear the ends of previously engaged sticks, and means for thereafter fully lowering the yoke member to cause the blades to push sticks clear of the column and insert them into the confections.

12. The apparatus of claim 11; wherein said blade jogging means comprises a toggle linkage, and means for moving said linkage from one side of dead center to the other side thereof for first partially lowering and thereafter slightly raising said yoke member.

13. The apparatus of claim 9; comprising stick guide means includes an elongate bottom guide rail, means for movably mounting said bottom guide rail, means for moving said rail to a stick guiding position under the column of sticks, means for moving said rail out from under the lower ends of the column of sticks before the yoke member is lowered, and means for moving said rail for returning it back to its stick guiding position after sticks have been inserted into the confection and for engaging the bottom ends of partially displaced sticks and aligning them with other sticks in said column.

14. The apparatus of claim 13; comprising fixed stick retaining rail means below said column of sticks, said fixed rail means having gaps below said blades for accommodating displacement of sticks from the column.

15. Apparatus for inserting flat sticks into confections comprising; guide means for supporting a column of sticks having their ends adjacent to a row of spaced confections, a backstop for the column at the downstream end of said guide means, means for feeding a column of sticks into said guide means, means separate from said feeding means for packing the column of sticks within said guide means in face-to-face abutment with one another and against said backstop, and means spaced apart along said guide means for simultaneously ejecting a plurality of spaced individual sticks lengthwise out of the packed column and into adjacent confections.

16. The apparatus of claim 15 wherein said ejecting means comprises a plurality of pusher blades and means for reciprocating said blades into said column to eject sticks from the column.

17. The apparatus of claim 16 wherein said packing means comprises means for engaging sticks in said column at a position adjacent the end of said guide means into which the sticks are fed, means for intermittently pushing the said stick engaging means toward said backstop for packing the sticks between said backstop and said gripping means.

18. The apparatus of claim 15 wherein said packing means comprises means for engaging sticks in said column at a position near the end of said guide means into which the sticks are fed, and means for advancing said gripping means with a controlled pressure.

19. The apparatus of claim 18 wherein said stick gripping means comprises a pair of opposed members for frictionally engaging opposite edges of several sticks in the column.

20. The apparatus of claim 18 wherein said stick gripping means comprises opposed arms on opposite sides of the column of sticks and means for rotatably respectively mounting said opposed members to said opposed arms.

21. The apparatus of claim 18 comprising brake means for releasably holding said gripping means at a fixed position during ejection of sticks from the column.

22. In a machine for producing confections or the like having a row of confection receiving molds, apparatus for inserting flat sticks into the confections comprising: guide means for supporting a continuous column of sticks above the molds, a backstop for the column at the downstream end of said guide means, means for feeding a column of sticks into the upstream end of said guide means, a row of elongate pusher blades, means for lowering the pusher blades into the column within said guide means to simultaneously force a plurality of spaced individual sticks lengthwise out of the column to insert them into underlying confections, and means separate from said feeding means disposed between said feeding means and said inserting apparatus near said upstream end of said guide means for packing the column of sticks within said guide means in face-to-face abutment and against said backstop.

23. The machine of claim 22; comprising meand for selectively isolating the packed column within said guide means from force applied by said feeding means.

24. The machine of claim 23; wherein said packing means comprises means for engaging the sticks in the column of sticks near the upstream end of said guide means and means for forcing said gripping means toward the backstop with a selected force.

25. Stick inserting apparatus for simultaneously pushing a row of elongate sticks into confections carried by a row of underlying mold cavities, said apparatus comprising means for forming a column of vertically disposed sticks in aligned, closed engagement, blade means for simultaneously pushing spaced individual sticks from said column and into confections in the underlying mold cavities and means for reciprocating said blade means for alternately pushing the sticks and for retracting said blade means from the column, said blade means comprising a row of thin, flat faced, elongate blades within their flat faces disposed normal to the row axis and with their lower ends disposed for pushing the sticks, and means for selectively retaining those sticks within the column that are not pushed from the column of sticks.

26. The stick inserting apparatus of claim 25 wherein said stick retaining means includes a plurality, of separate springs adjacent each pusher blade, said springs including end portions adapted to normally project partially under the ends of the sticks that are proximal the confections.

27. A frozen confection machine comprisng a plurality of longitudinally spaced transversely extending mold plates carrying downwardly extending generally rectangular molds oriented so that their major dimension is normal to length of said mold plates;

means for intermittently advancing said mold plates;

means, located directly above said mold plates, for retaining sticks formed to produce a continuous closely packed transversely extending column of sticks lying in a vertical plane containing the axis of symmetry of the rectangular molds;

and means, operable when a mold plate is momentarily arrested below said retaining means, for simultaneously plural selected sticks in a linear path contained in said vertical plane into confections formed in said molds.

* * * * *